(12) United States Patent
Holthouse et al.

(10) Patent No.: US 6,606,598 B1
(45) Date of Patent: Aug. 12, 2003

(54) STATISTICAL COMPUTING AND REPORTING FOR INTERACTIVE SPEECH APPLICATIONS

(75) Inventors: Mark A. Holthouse, Newtonville; Matthew T. Marx, Everett; John N. Nguyen, Arlington, all of MA (US)

(73) Assignee: SpeechWorks International, Inc., Boston, MA (US)

( * ) Notice: Subject to any disclaimer, the term of this patent is extended or adjusted under 35 U.S.C. 154(b) by 0 days.

(21) Appl. No.: 09/400,707

(22) Filed: Sep. 21, 1999

Related U.S. Application Data

(60) Provisional application No. 60/101,401, filed on Sep. 22, 1998.

(51) Int. Cl.[7] ............................................. G10L 15/22
(52) U.S. Cl. ..................... 704/275; 704/236; 704/246
(58) Field of Search ............................... 704/236, 275, 704/251, 246, 270; 379/34; 709/222, 223, 224

(56) References Cited

U.S. PATENT DOCUMENTS

| | | | | |
|---|---|---|---|---|
| 4,959,864 A | * | 9/1990 | Nes et al. .................... | 704/251 |
| 5,294,229 A | | 3/1994 | Hartzell et al. .............. | 434/336 |
| 5,317,732 A | | 5/1994 | Gerlach, Jr. et al. ........ | 707/104 |
| 5,367,609 A | | 11/1994 | Hopper et al. ............... | 704/278 |
| 5,495,522 A | | 2/1996 | Allen et al. .................. | 379/202 |
| 5,574,843 A | | 11/1996 | Gerlach, Jr. ................. | 345/418 |
| 5,581,600 A | | 12/1996 | Watts et al. ................. | 379/88.02 |
| 5,740,233 A | * | 4/1998 | Cave et al. .................. | 379/113 |
| 5,787,455 A | * | 7/1998 | Seybold ....................... | 711/100 |
| 5,812,533 A | | 9/1998 | Cox et al. .................... | 370/259 |
| 5,822,401 A | * | 10/1998 | Cave et al. .................... | 379/34 |
| 6,173,266 B1 | * | 1/2001 | Marx et al. ................. | 704/270 |
| 6,219,643 B1 | | 4/2001 | Cohen et al. ............... | 704/257 |
| 6,230,197 B1 | * | 5/2001 | Beck et al. .................. | 709/223 |
| 6,377,662 B1 | * | 4/2002 | Hunt et al. ................. | 379/88.01 |

* cited by examiner

*Primary Examiner*—Daniel Abebe
(74) *Attorney, Agent, or Firm*—Hale and Dorr LLP

(57) ABSTRACT

A method and apparatus are disclosed for computing and reporting statistical information that describes the performance of an interactive speech application. The interactive speech application is developed and deployed for use by one or more callers. During execution, the interactive speech application stores, in a log, event information that describes each task carried out by the interactive speech application in response to interaction with the one or more callers. After the log is established, an analytical report is displayed. The report describes selective actions taken by the interactive speech application while executing, and selective actions taken by one or more callers while interacting with the interactive speech application. Information in the analytical report is selected so as to identify one or more potential performance problems in the interactive speech application. The analytical reports are generated based on the information stored in the event logs. Each line of the event log is associated with a particular call and is identified by a unique call number. Each line of the event log is then processed to calculate and extract data needed for the analytical reports.

39 Claims, 13 Drawing Sheets

STATISTICAL COMPUTING AND REPORTING FOR INTERACTIVE SPEECH APPLICATIONS

RELATED APPLICATION

This application claims priority from prior provisional application Ser. No. 60/101,401, filed Sep. 22, 1998, entitled STATISTICAL COMPUTING AND REPORTING FOR INTERACTIVE SPEECH APPLICATIONS, and naming as inventors Mark A. Holthouse, Matthew T. Marx, John N. Nguyen, which is hereby incorporated by reference in its entirety as if fully set forth herein.

FIELD OF THE INVENTION

The present invention relates to computer software. The invention relates more specifically to approaches for computing and displaying statistical information about the performance of interactive speech applications.

BACKGROUND OF THE INVENTION

Computer-based interactive speech applications provide automated interactive communications. For example, a computer-based interactive speech application may be used in a telephone system to automatically answer an incoming call and engage in a dialogue with the caller in order to route the call, provide requested information, or process a transaction. Using speech recognition technology, the application is able to convert a caller's speech into a textual representation and thereby understand what the caller is saying. These applications are also sometimes categorized under the general heading of interactive voice response (IVR) applications. Where they involve the use of speech recognition technology, these applications are defined here under the more narrow term, "interactive speech applications".

In the past, developing interactive voice response applications that use speech recognition technology has been difficult for the enterprises that implement these applications, their programmers, and others. The software development tools and application testing tools available for use in the development process have been less than satisfactory. One recent significant improvement in the development process involves the use of re-usable software components, commercially known as DialogModules™, that a developer may interconnect to produce effective interactive speech applications quickly. This modular approach is described in co-pending U.S. patent application Ser. No. 09/081,719, filed May 6, 1998, entitled "System and Method for Developing Interactive Speech Applications."

Although the modular approach represents a significant advance in the development process, there is still a need for an effective way to determine whether a completed interactive speech application is working effectively. Generally, a developer or programmer prepares an interactive speech application by hand-writing source code, assembling pre-defined objects, or joining modular components using a system such as DialogModules™. The developer compiles the program, installs it on a test system, and verifies that it operates correctly in response to test telephone calls. The program may be debugged and rewritten over a period of time. The completed application is then launched and used on a "live" basis.

Even though a completed application operates correctly, meaning that there are no errors in the program code, it may not perform in an optimal manner in a live environment. Detecting performance problems is difficult. Performance problems include a variety of issues or defects, such as the inability of repeated callers to understand a particular prompt or option, callers becoming "lost" in the logical flow of the application, etc. In the past, developers have received feedback on such problems in a manual way, such as by callers calling an institution to complain about its voice response system.

Thus, there is a need for an automated way to provide feedback on the usability or effectiveness of a completed application.

In addition, there is a need for tools that can be used to identify potential problems with particular components of an application, such as vocabulary, prompts, and call flow.

There is also a need for a mechanism that can analyze performance of an application, compute statistical information that reveals the characteristics of the performance, and provide reports containing information that can be used to "tune" or improve performance of the application.

There is also a need for a mechanism that can provide analytical statistical information about a call that involves use of an interactive speech application.

SUMMARY OF THE INVENTION

The foregoing needs, and other needs and objects that will become apparent from the following description, are achieved by the present invention, which comprises, in one embodiment, a method for generating information useful in improving performance of an interactive speech application program, the method comprising the steps of: receiving, from an event log that is generated by the interactive speech application during a call from a caller, one or more event values associated with one or more calls, wherein each of the event values describes a task carried out by the interactive speech application during the call and in response to interaction with the caller; generating a statistical summary of the performance of the interactive speech application based on the event values.

One feature of this aspect is modifying one or more parameters of the interactive speech application, to improve its performance, based using the statistical summary.

Another feature of the aspect is generating a report describing transaction results for each module of the interactive speech application.

In another feature, generating the statistical summary further comprises generating a report of results of attempts to collect primary module data from the caller.

In another feature, generating the statistical summary further comprises generating a report describing recognition context results.

According to another feature, generating the statistical summary further comprises generating a report describing vocabulary results.

According to still another feature, generating the statistical summary further comprises generating a report describing context statistics.

In another feature, generating a statistical summary further comprises: reading a current event value from the event log; determining an identity of a call associated with the current event value; processing call information values associated with the current event value to produce statistical data associated with each call; iteratively repeating the reading, determining, and processing steps until all the events in the event log have been processed; creating the statistical summary based on the statistical data.

In another feature, processing call information values further comprises creating and storing call initiation data for reporting on call initiation of each call when the current event is a Start of Call event.

According to another feature, processing call information values further comprises creating and storing call duration data for reporting on call duration for each call when the current event is an End of Call event.

In another feature, processing call information values further comprises determining whether any module data exists for a current module associated with a Start of Module event when the current event is the Start of Module event.

In another feature, processing call information values further comprises determining recognition context data when the current event is a Start of Recognition event.

According to another feature, processing call information values further comprises updating timing information associated with the current recognition context when a Beginning of Speech keyword is present and when the current event is a Start of Utterance event.

In another feature, processing call information values further comprises updating timing information associated with the current recognition context when the current event is a Recognition Timing event and the Start of Utterance event does not contain timing information.

In another feature, processing call information values further comprises creating and storing results of attempts to collect primary module data associated with the current module when the current event is an End of Module event.

According to yet another feature, processing call information values further comprises creating and storing recognition context results associated with the current recognition context when the current event is an End of Recognition event.

According to another feature, creating and storing call initiation data further comprises: incrementing a number of calls value represented in the event log; and incrementing a number of executions value and a number of disconnects value when the Start of Call event is encountered while processing the current module.

In another feature, creating and storing call duration data for reporting on call duration for each call further comprises: determining a call duration value represented in the event log; and incrementing a number of executions value and a number of disconnects value when the End of Call event is encountered while processing the current module.

In another feature, determining whether any module data exists for a current module further comprises: creating and storing a new module data element when no module data exists for the current module; and initializing the new module data element with current module information.

In another feature, recognition context data further comprises: determining a current recognition context value based on the event log; initializing the recognition context data using the current recognition context value; updating the current module data based on a previous recognition context value when the current recognition context has a status value that is not Spelling, Confirmation or Start of Recognition; and setting the status value of the current recognition context to Start of Recognition.

In another feature, updating the current module data based on a previous recognition context value further comprises incrementing a value representing a number of acceptances associated with attempts to collect primary module data from the caller when the previous recognition context is Accepted.

According to another feature, updating the current module data based on a previous recognition context value further comprises incrementing a value representing a number of unknowns associated with attempts to collect primary module data from the caller when the previous recognition context is Confirmation.

In another feature, updating the current module data based on a previous recognition context value further comprises incrementing a value representing a number of rejections associated with attempts to collect primary module data from the caller when the previous recognition context is Rejected.

In another feature, updating the current module data based on a previous recognition context value further comprises incrementing a value representing a number of negative caller responses to confirmations associated with attempts to collect primary module data from the caller when the previous recognition context is Confirmed False.

In another feature, updating the current module data based on a previous recognition context value further comprises incrementing the number of affirmative caller responses to confirmations associated with attempts to collect primary module data from the caller when the status of the previous recognition context is Confirmed True.

In another feature, updating the current module data based on a previous recognition context value further comprises incrementing the number of collections of caller responses.

In another feature, updating timing information further comprises: incrementing a value representing a number of utterances associated with the current recognition context; determining a time value for a beginning of speech based on the event log; determining a response time value based on the event log; determining whether the caller barged-in; and storing, in association with the current recognition context, the value representing the number of utterances, the time value, the response time value, and a value representing whether the caller barged in.

In another feature, updating the timing information further comprises: incrementing a value representing a number of utterances associated with the current recognition context; determining a time value for the beginning of speech based on the event log; determining a response time value based on the event log; determining whether the caller barged-in based on the event log; creating and storing a duration data when a keyword indicating speech duration is present in the event log; and storing, in association with the current recognition context, the value representing the number of utterances, the time value, the response time value, a value representing whether the caller barged in, and the duration data.

According to another feature, creating and storing results of attempts to collect primary module data further comprises: if a vocabulary item was previously stored, then: incrementing the number of times the vocabulary item has occurred; updating a vocabulary information to indicate that spelling was used when the vocabulary item had to be spelled; and updating the vocabulary information to indicate confirmation when the vocabulary item was confirmed.

In another feature, generating recognition context results further comprises storing speech duration data when a keyword indicating speech duration is present in the End of Recognition event.

In another feature, generating recognition context results further comprises the steps of: if the recognition context result is "ok", then obtaining a list of vocabulary items and a match-confidence score; and incrementing the number of successful results for the current recognition context.

In another feature, generating recognition context results further comprises the steps of: if the in-vocabulary score and match-confidence score value are both greater than a first pre-determined value, then selectively setting the status of the current recognition context according to information in the log file and the match-confidence score value; selectively updating vocabulary data based on a value of the current recognition context; and incrementing one or more counter values that define actions taken by the caller according to values obtained from the log file.

According to another feature, generating a report of transaction results further comprises, for each module of the interactive speech application, creating and displaying a success rate value based on a sum of a percentage of transactions assumed to be correct and a percentage of transactions that ended in a command divided by the sum of the percentage of transactions assumed to be correct and a percentage of transactions that ended in the command and a percentage of transactions that failed.

In another feature, generating a report of results of attempts to collect primary module data further comprises, for each module of the interactive speech application, creating and displaying the percentage of attempts that were accepted, confirmed true, confirmed false, and rejected.

According to still another feature, generating a report of recognition context results further comprises creating and displaying a percentage of successes for each recognition context of each module, percentage of failures for each recognition context of each module, a percentage of time-outs for each recognition context of each module, a percentage of occurrences when the caller spoke too long for each recognition context of each module, a percentage of stops for each recognition context of each module, a percentage of caller hang-ups for each recognition context of each module, a percentage of aborted operations for each recognition context of each module; and a percentage of errors that occurred for each recognition context of each module.

In another feature, generating a report of attempts to collect primary module data further comprises creating and displaying a percentage of times that the caller had to confirm each answer for each module, a percentage of times that the caller had to use a fallback mechanism for each answer for each module, and a percentage of times that the caller had to disambiguate each answer for each module.

In another feature, generating a report of results of attempts to collect primary module data further comprises creating and displaying an average duration of an utterance for each recognition context for each module, an average response time of a recognizer mechanism for each recognition context for each module, an average duration that the caller waited before speaking for each recognition context for each module, the speech duration of the caller as a percentage of the total time in the recognition context for each module, and the percentage of time that the caller barged-in for each recognition context for each module.

In other aspects, the invention encompasses a computer-readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
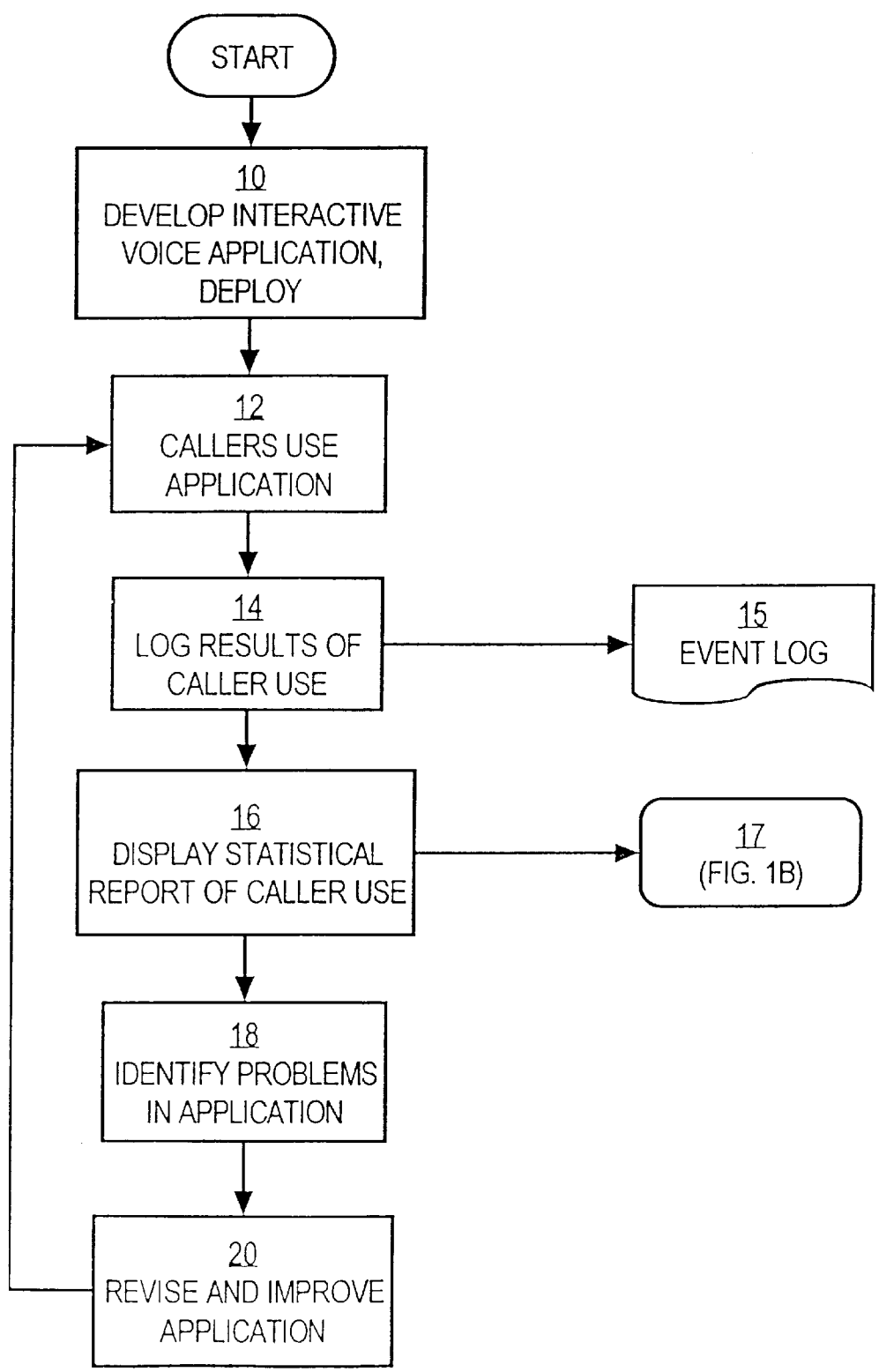
FIG. 1A is a flow diagram of a process of improving performance of an interactive speech application.

A method and apparatus for improving performance of an interactive speech application is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

In contrast to touch tone systems, interactive speech applications often involve iterative tuning processes used for training the speech recognizer in the interactive speech application. The speech recognizer is trained to recognize a caller's speech.

Touch tone (DTMF) interactive voice response systems are inherently simpler than interactive speech systems because touch tone systems need only recognize and respond to a limited range of DTMF frequencies or tones. On the other hand, a speech recognizer in an interactive speech application is expected to understand human speech that spans a wide range of frequencies in countless combinations. More important, the frequencies produced by speech often encompass higher harmonics resulting in what is commonly known as overtones. Moreover, speech is delivered in a variety of cadences and accents. Thus, based on the complexities inherent in speech recognition systems, the processes used to train a speech recognizer, tune and report on performance are different from touch tone systems.

As disclosed below, the processing of speech recognition events includes creating, storing and displaying statistical data based on the context information provided by the embodiment. Among other things, the context information indicates whether the speech recognizer requested confirmation from the caller of a particular utterance made by the caller. The speech recognizer requests confirmation of an utterance whenever the speech recognizer is unsure of the utterance. Another example of context information provided by the embodiment is whether an utterance made by a caller is a first attempt or a re-attempt at the utterance by the caller. The occurrence of confirmation of an utterance by the caller and or the occurrence of multiple attempts at an utterance by the caller identify one or more problems in the application. The user may then revise the application to correct the identified problems. In contrast, touch tone systems do not involve creating, storing or displaying the above context information.

In the preferred embodiment, the invention provides a method of improving performance of an interactive speech application. One aspect of the invention is an approach or mechanism that can report statistical and analytical information about one or more complete phone calls carried out between a caller and an interactive speech application, and about the performance of the application itself.

FIG. 1A is a flow diagram that illustrates a preferred embodiment of a method of improving performance of an interactive speech application.

In block 10, the interactive speech application is initially developed and deployed. The application may implement a call routing service, an automated attendant service, a fax-on-demand service, or any other desired application. Block 10 may involve the steps of executing a development environment such as DialogModules™, interconnecting one or more program components, running the completed program, debugging it, and deploying the completed and debugged application to callers in a live production environment. In this context, a person who writes or develops the application is called a "developer" or "user" and a person who calls the completed application to carry out some task with it is called a "caller."

In block 12, one or more callers use the interactive speech application, for example, by calling a telephone number associated with the application and interacting with the application to receive information or connect a call to a desired party.

In block 14, results of the caller interactions or uses are logged. Block 14 may involve having the application, or a module or component of the application, write an event log 15 that contains information about how the application executed.

In block 16, a user or developer of the application may display a statistical report of the caller interactions or uses. For each utterance of the caller, a user of the mechanism disclosed herein can view a variety of reports that display statistical information about how the application operated according to several different heuristic measures. This mechanism enables the user to identify one or more problems in the application, as shown by block 18. By displaying statistical information for a few phone calls, a user of this approach very rapidly can understand whether callers are satisfied with operation of the application. The user can also diagnose any user-interface problems based on the information provided by this approach.

The user may then revise and improve the application, as indicated by block 20. The process of block 10 through block 20 may be repeated as often as desired or necessary to improve and tune performance of the application.

Operational Overview

The preferred embodiment comprises an interactive computer program or report generator that analyzes a file or one or more records that describe one or more previously recorded phone calls involving a calling party and an interactive speech application, and reports statistical and analytical information about the calls and the performance of the application. In one embodiment, the interactive computer program is called "appstats" and is preferably executed from a command-line prompt of an operating system that is executed by a computer system optimized for use in interactive speech applications. The interactive speech application runs on the same computer system under control of the operating system.

Invocation and Arguments

Preferably, the program may be executed with the following invocation:

>appstats <logFileName> in which "<logFileName>" is a required argument. The <logFileName> argument identifies a previously stored event log file that contains call information. Multiple event log files may be used in the argument, <logFileName>, by specifying the file name of each of the event log files separated by a space or a comma. For example, the invocation >appstats event1.log event2.log . . .

specifies the file names of several event log files as the argument.

Statistical Reports

The report generator provides statistical information based on data logged from calls that are processed by the interactive speech application. The interactive speech application generates the call logs. The statistical information summarizes the performance of the interactive speech application. The report generator provides a single statistical summary for all the event logs specified by the user or the interactive speech application.

In one embodiment, the interactive speech application is based upon modular speech application elements. Preferably, the modular speech application elements ("Modules") are of the type disclosed in co-pending application Ser. No. 09/081,719, filed May 06, 1998, "System and Method for Developing Interactive Speech Applications," naming as inventors Marx et al., the entire disclosure of which is hereby incorporated by reference. In this embodiment, the statistical summary comprises a series of reports on Module transaction completion rates, callflow, results classified by vocabulary, and context recognition results. Each report is further below.

Call-start and Call-length Histogram Report

Call-Start Histogram and Call-Length Histogram reports provide information on calls themselves, including the number of calls and the average length of each call. Table 1 illustrates an example of Call-Start and Call-Length Histograms.

TABLE 1

CALL START HISTOGRAM, CALL LENGTH HISTOGRAM total calls = 21
seconds per call = 618.0

CALL-START HISTOGRAM

| | | | | | |
|---|---|---|---|---|---|
| 00:00–01:00 | 0 | 0.0% | 12:00–13:00 | 0 | 0.0% |
| 01:00–02:00 | 0 | 0.0% | 13:00–14:00 | 2 | 9.5% |
| 02:00–03:00 | 0 | 0.0% | 14:00–15:00 | 14 | 66.7% |
| 03:00–04:00 | 0 | 0.0% | 15:00–16:00 | 2 | 9.5% |
| 04:00–05:00 | 0 | 0.0% | 16:00–17:00 | 0 | 0.0% |
| 05:00–06:00 | 0 | 0.0% | 17:00–18:00 | 0 | 0.0% |
| 06:00–07:00 | 0 | 0.0% | 18:00–19:00 | 0 | 0.0% |
| 07:00–08:00 | 0 | 0.0% | 19:00–20:00 | 0 | 0.0% |
| 08:00–09:00 | 3 | 14.3% | 20:00–21:00 | 0 | 0.0% |
| 09:00–10:00 | 0 | 0.0% | 21:00–22:00 | 0 | 0.0% |
| 10:00–11:00 | 0 | 0.0% | 22:00–23:00 | 0 | 0.0% |
| 11:00–12:00 | 0 | 0.0% | 23:00–24:00 | 0 | 0.0% |

CALL-LENGTH HISTOGRAM

| | | |
|---|---|---|
| 0 s–5 s: | 4 | 19.0% |
| 5 s–10 s: | 0 | 0.0% |
| 10 s–15 s: | 0 | 0.0% |
| 15 s–30 s: | 2 | 9.5% |
| 30 s–1 m: | 4 | 19.0% |
| 1 m–2 m: | 4 | 19.0% |
| 2 m–3 m: | 3 | 14.3% |
| 3 m–5 m: | 3 | 14.3% |
| 5 m–10 m: | 0 | 0.0% |
| 10 m–20 m: | 0 | 0.0% |
| 20 m–40 m: | 5 | 23.8% |
| >40 m: | 0 | 0.0% |

As shown in Table 1, the first and fourth columns in the Call-Start Histogram show a 24-hour period broken into one hour time blocks. The second and fifth columns indicate the number of calls occurring in a given time block. The third and sixth columns indicate, as a percentage of total calls, the number of calls occurring in a given time block. Thus, the Call-Start Histogram provides information on when each call was initiated, and of the number of calls initiated during each time block in a 24-hour period.

The Call-Start Histogram is generated by examining Start of Call events from the stored information in the event log files specified in the invocation of the report generator. A Start of Call event is logged at the start of a call. The report generator maintains a counter that increments the number of calls as it encounters each Start of Call event. In addition, the report generator updates the Start of Call Histogram.

The Call-Length Histogram indicates the duration of each call. As shown in the above table, the first column in the Call-Length Histogram indicates the length of time for each call. Each row of the second column indicates the number of calls that were of a duration that fell within the range of time as indicated by the corresponding row in the first column. The third column indicates, as a percentage of total calls, the number of calls corresponding to a given range of duration.

The Call-Length Histogram is generated by examining the End of Call event. An End of Call event is logged each time a call completes. The report generator determines the duration of each call and updates the Call-Length Histogram when examining the End of Call event.

Module Transaction Results Report

A Module Transaction Results report summarizes execution results for each Module. The report generator produces the Module Transaction Results report by examining the data structure associated with a given Dialog Module. As shown in Table 2, the number column reports the number of times that each Module was executed.

TABLE 2

MODULE TRANSACTION RESULTS REPORT

MODULE TRANSACTION RESULTS

| name | number | % assm | % comd | % fail | % dtmf | % disc | % succ |
|---|---|---|---|---|---|---|---|
| Menu | 94 | 86.2% | 0.0% | 1.1% | 6.4% | 6.4% | 98.7% |
| Digits | 61 | 96.7% | 0.0% | 0.0% | 0.0% | 3.3% | 100% |

Table 2 shows results for Menu and Digits modules. Each of the next columns corresponds to a different return code from the execution of each module, as follows:

| | |
|---|---|
| % assm | A standard result was recognized successfully. |
| % comd | A command was recognized successfully. |
| % fail | The Module was not able to complete recognition within the number of retries specified. |
| % dtmf | The caller generated Dual Tone Multi-Frequency ("DTMF") tones during execution. |
| % disc | The caller hung up during the Module execution. |
| % succ | The overall success rate of a given Module. |

The results corresponding to the above return codes derive from data stored in data structures of the modules containing statistical data on each execution of a given Module. The report generator updates the information in the Module data structures when examining an event. For example, when the report generator encounters a End of Module event, it tracks the number of executions of a Module and maintains counters to track the number of times the Module was unable to complete recognition or the number of times a call hang-up occurred during the execution of the Module.

The report generator extracts statistical data from a data value in each Module to report the results corresponding to % assm, % comd, % fail, % dtmf, and % disc. The % succ result gives an indication of the overall success rate of the module and is computed from the following formula:

$$(\% \text{ assm} + \% \text{ comd})/(\% \text{ assm} + \% \text{ comd} + \% \text{ fail})$$

Thus, the success rate is computed as the number of standard and command results recognized divided by the total number of executions that do not result in DTMF or hang-up. Success rates lower than 90% indicate problem areas that can be isolated by studying the additional reports given below.

Module Callflow Results Report

A Module Callflow Results report, shown in Table 3, summarizes results of each attempt to collect the primary Module data from the caller.

TABLE 3

MODULE CALLFLOW RESULTS

MODULE CALLFLOW RESULTS

| name | numcol | % accept | % conf-y | % conf-n | % reject | % unknown | avg-utts |
|---|---|---|---|---|---|---|---|
| enu | 87 | 89.7% | 3.4% | 4.6% | 1.1% | 1.1% | 1.3 |
| igits | 60 | 98.3% | 0.0% | 0.0% | 1.7% | 0.0% | 1.0 |

In the Module CallFlow Results table below, the numcol column reports the number of such collections. The report generator examines either the current status of a Module or the processes the data during a recognition to update information for reporting statistical results. The results of each attempt to collect primary data from the caller are broken down as follows:

| | |
|---|---|
| % accept | accepted without confirmation. |
| % conf-y | confirmed and accepted by the caller. |
| % conf-n | confirmed and denied by the caller. |
| % reject | rejected by the recognizer. |
| % unknown | status unknown. |

High values for denied confirmation and rejection indicate that recognition is not performing well. There could be many causes, including misleading prompts, incorrect pronunciations, or vocabulary words that are similar enough to be confused with each other. To further investigate the problem, an analytical tool may be used to listen to a sampling of phone calls. An example of an analytical tool suitable for this purpose is disclosed in co-pending U.S. patent application Ser. No. 09/159,272, filed on Sep. 22, 1998, attorney docket number 47898-033, entitled "IMPROVING PERFORMANCE OF AN INTERACTIVE SPEECH APPLICATION."

The avg-utts column reports the average number of utterances required for each execution of the Module, and provides an indication of how quickly callers are able to accomplish the task. High values for avg-utts indicate that callers are spending too much time confirming or repeating their selection.

Context Results Report

A Context Results report summarizes the result of each recognition, subdivided by context within the Module. The report generator processes the data collected during each recognition event to update statistical data on recognition status. In Table 4 below, the number column gives the number of recognitions found for a given context within a Module. The other columns report results of each recognition as follows:

| | |
|---|---|
| % succ | success: an answer was returned from the recognizer. |
| % fail | failure: speech was detected, but no answer was found. |
| % time | time-out: the caller didn't speak within the required duration. |
| % maxs | max-speech: the caller spoke longer than the maximum speech duration allowed. |
| % dtmf | dtmf: DTMF was pressed. |
| % disc | disconnect: the caller hung up. |

If the time-out rate is high and the recognition was not designed to be optional, then the before_begin_of_speech_timeout configuration parameter may need to be increased. If callers frequently exceeded the allowed maximum speech duration for a particular context recognition, then an increase in the max_speech_duration parameter may be considered. A high failure rate may be an indication that a large number of callers are speaking out-of-vocabulary, and thus warrants further investigation using the above-described analytical tool.

TABLE 4

CONTEXT RESULTS REPORT

CONTEXT RESULTS

| name | number | % succ | % fail | % time | % maxs | % dtmf | % disc |
|---|---|---|---|---|---|---|---|
| MODULE: Menu (VMNU) | | | | | | | |
| ALTECH_VOICE_MENU | 105 | 84.8% | 0.0% | 9.5% | 0.0% | 0.0% | 0.0% |
| ALTECH_YES_NO | 13 | 100% | 0.0% | 0.0% | 0.0% | 0.0% | 0.0% |
| MODULE: Digits (DIGT) | | | | | | | |
| ALTECH_DIGITS | 63 | 93.7% | 3.2% | 3.2% | 0.0% | 0.0% | 0.0% |

Module Vovcabulary Results Report

A Module Vocabulary Results report, shown in Table 5, summarizes results classified by the returned answer. Even though the answer returned by the Module is not guaranteed to be what the caller said, it is correct at a high percentage of the time, and can be used to reliably give an indication of how easily callers were able to specify each result. For example, the report can provide information for the item-list and voice-menu modules. The report generator is able to produce the report by post processing the data collected in each End of Module event and End of Recognition event.

As before, the numcol column gives the number of collections (also expressed as a percentage of total collections) for each answer provided by the caller. The avg-utts column reports, for each context recognition, the average number of utterances that were needed to provide an answer. The remaining columns provide the following information:

| | |
|---|---|
| % confirm | percentage of time the caller had to confirm the answer. |
| % fallback | percentage of time the caller had to use the fallback mechanism, such as spelling a word. |
| % disamb | percentage of time the caller had to disambiguate. |

High scores reported in any of the above fields for a particular answer may be an indication that the caller is confusing the item with another item, or that the pronunciation of the item may need tuning to increase likelihood of comprehension by the caller.

TABLE 5

MODULE VOCABULARY RESULTS REPORT

MODULE VOCABULARY RESULTS

| name | numcol | avg-utts | % confirm | % fallback | % disamb |
|---|---|---|---|---|---|
| MODULE: Menu (VMNU) | | | | | |
| two | 25 (26.6%) | 1.28 | 16.0% | 0.0% | 0.0% |
| one | 31 (33.0%) | 1.00 | 0.0% | 0.0% | 0.0% |
| pound | 0 (0.0%) | 0.00 | 0.0% | 0.0% | 0.0% |
| four | 10 (10.6%) | 1.60 | 20.0% | 0.0% | 0.0% |
| three | 10 (10.6%) | 1.00 | 0.0% | 0.0% | 0.0% |
| five | 3 (3.2%) | 1.00 | 0.0% | 0.0% | 0.0% |
| zero | 2 (2.1%) | 1.00 | 0.0% | 0.0% | 0.0% |
| asterisk | 1 (1.1%) | 3.00 | 100% | 0.0% | 0.0% |
| nine | 0 (0.0%) | 0.00 | 0.0% | 0.0% | 0.0% |
| MODULE: Digits (DIGT) | | | | | |

Context Statistics Report

A Context Statistics ("Context Stats") report, shown in Table 6 below, summarizes various statistics for each context. The report generator produces the report by processing data found either in the Start of Utterance event or Recognition Timing event for each context recognition. Each column is documented below:

| | |
|---|---|
| Utts | number of utterances found in a particular context, and the percentage of utterances found in that context out of the total number of utterances. |
| Sdur | average duration of each utterance, in seconds. |
| Resp | average amount of time the recognizer took to respond, in seconds. |
| Btim | average amount of time that the caller waits before speaking. This includes prompt time as well as time that the caller waits after the prompt. |
| % dens | speech density, which is the duration of speech divided by the total time spent in the context recognition, including prompt-listening time. |
| % barg | percentage of times the caller barged in. |

TABLE 6

CONTEXT STATS REPORT

=== CONTEXT STATS:

| name | utts | sdur | resp | btim | % dens | % barg |
|---|---|---|---|---|---|---|
| MODULE: Menu (VMNU) | | | | | | |
| ALTECH_VOICE_MENU | 89 (54.6%) | 0.64 | 0.45 | 9.41 | 6.4% | 91.0% |
| ALTECH_YES_NO | 13 (8.0%) | 0.64 | 0.42 | 4.54 | 12.3% | 69.2% |
| MODULE: Digits (DIGT) | | | | | | |
| ALTECH_DIGITS | 61 (37.4%) | 2.74 | 0.52 | 4.25 | 39.2% | 37.7% |

Operational Details of an Embodiment

Figure 3:
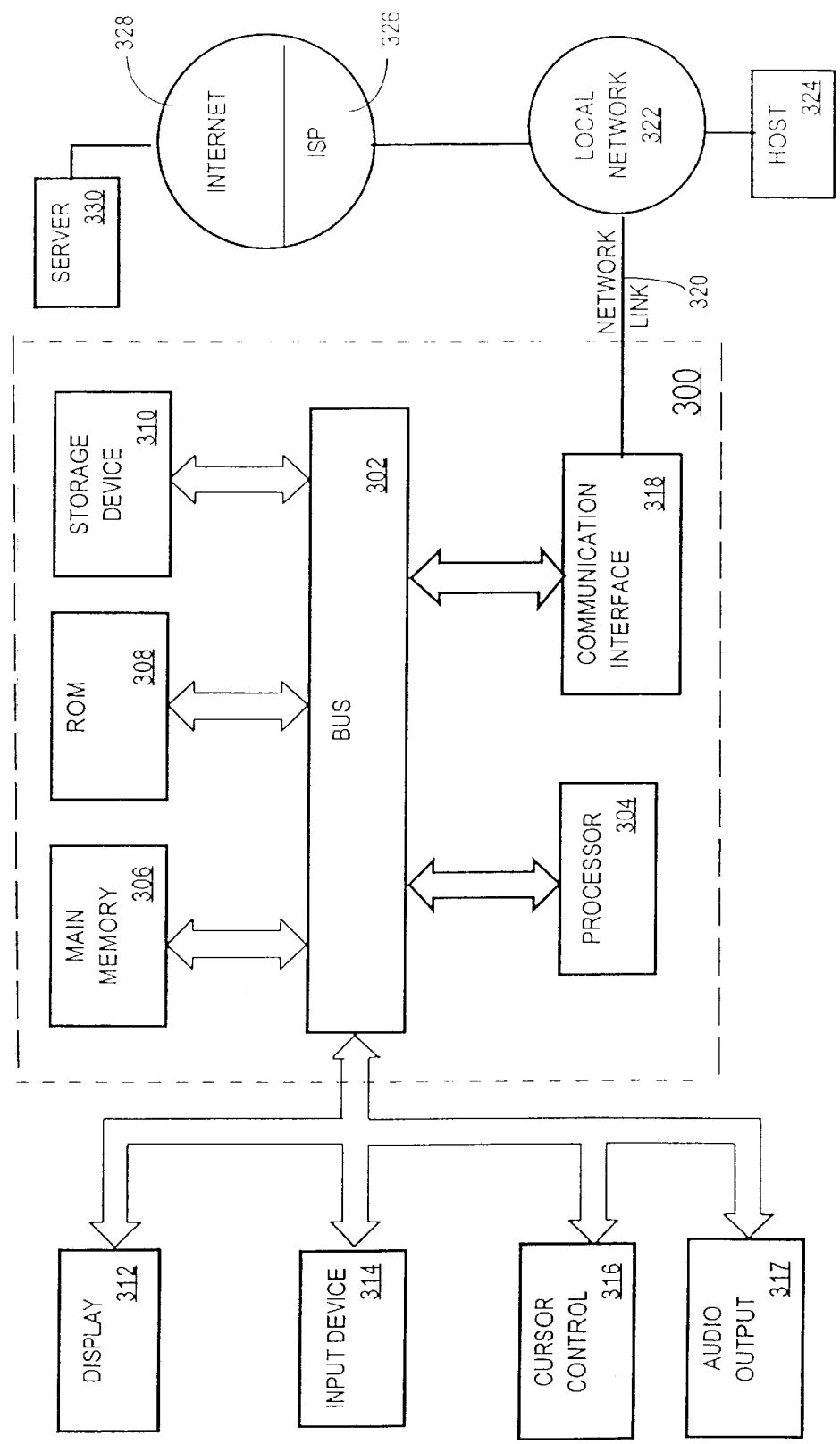
FIG. 3 is a block diagram of a computer system with which the invention may be carried out.
Figure 4:
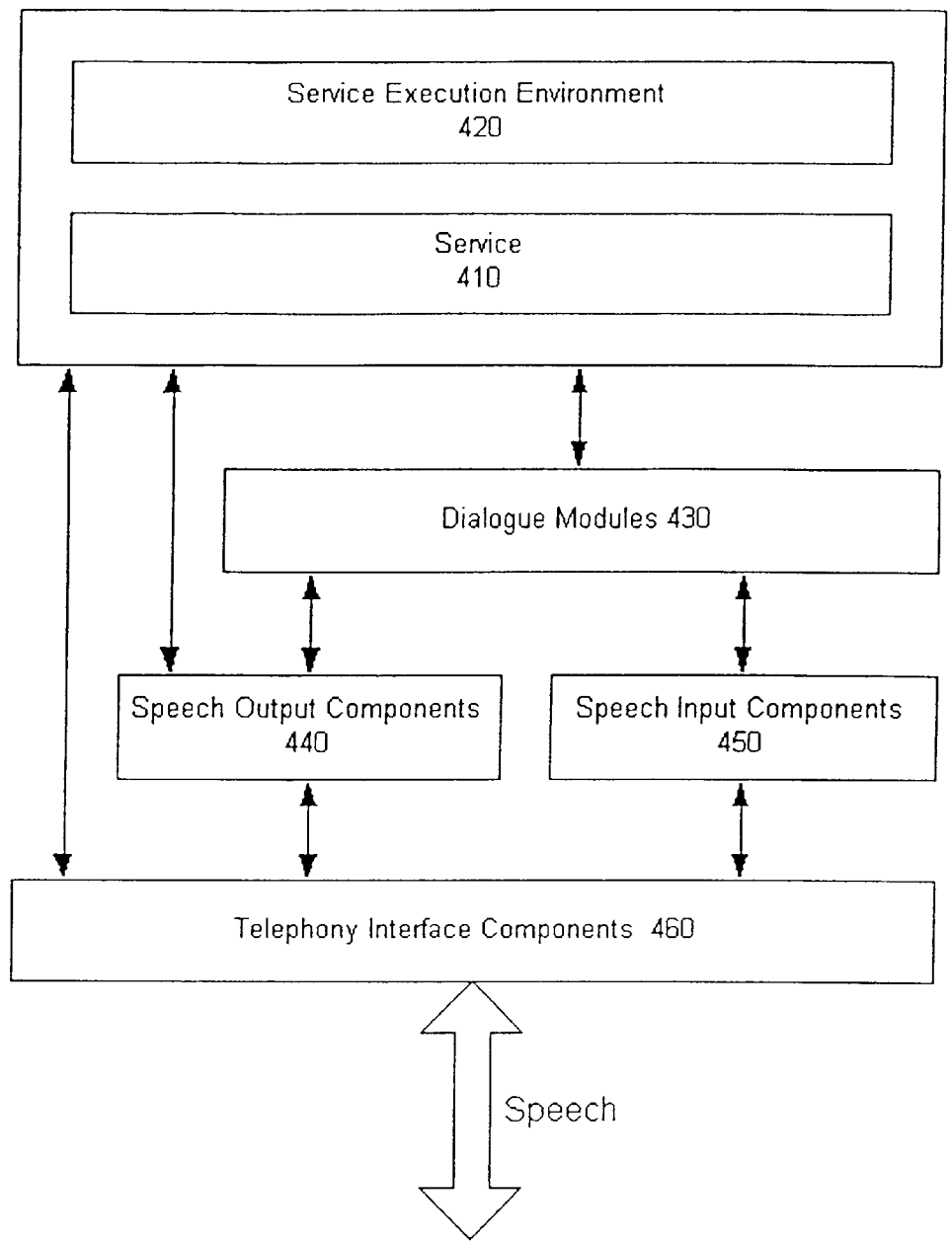
FIG. 4 is a block diagram of a software execution environment with which the invention may be carried out.

The drawing figures are flow diagrams of a preferred process of displaying, and reporting information about a pre-recorded call carried out between a caller and an interactive speech application. The process of the drawing figures preferably is implemented as one or more computer programs that are executed by a computer system that is used for application development purposes and is equipped with audio reproduction equipment. The computer system includes software or hardware that can audibly play back a digitized audio file. An example of a computer system that can be used is shown in FIG. 3. An example of a software execution environment that can be used to execute and control an interactive speech application or Service is shown in FIG. 4. The process of the drawing figures may be implemented within or as a component of Service Execution Environment 420 or Dialog Modules 430.

Obtaining Call Information

Figure 1B:
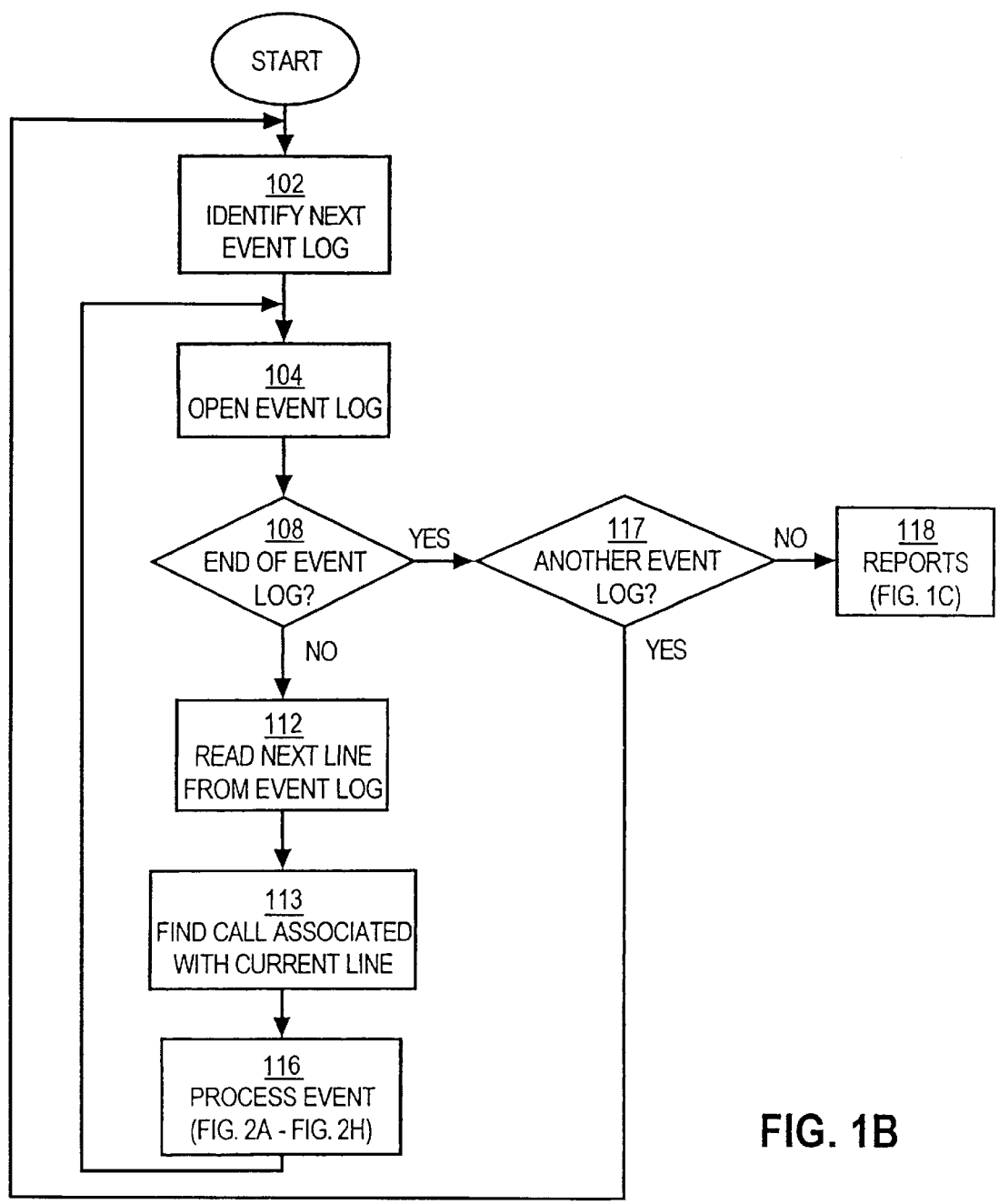
FIG. 1B is a flow diagram of a process of displaying statistical and analytical information about a call that is carried out using an interactive speech application.

Referring first to FIG. 1B, the process locates a directory, on a computer system on which the process is executing, that contains one or more sets of stored call information. Each set of stored call information may comprise, for example, an event log file. The event log file stores data representing one or more calls carried out between a calling party and the interactive speech application. Preferably, block 102 involves the steps of checking the command-line invocation of the program to determine whether the user of the program specified one or more event log files. If an event log file has been specified, then the process locates that file.

The first specified event log file is opened, as indicated by block 104. Block 104 may also involve the step of identifying a version designation of the event log file, to ensure that the process is operating with a compatible version of the event log file.

The event log file may store information representing one or more calls. Each call is uniquely identified by a call number. In an alternative embodiment, the process reads the event log file and skips to information in the event log file that represents a particular call as identified by a particular call number. The call information may correspond to a call number specified by the user in the command-line invocation of the program. For example, the process locates call number "1" in the event log file.

In the preferred embodiment, as each line of the event log is read, and the process performs a number of determinations as described below. Each line of the event log contains an event code. Event codes and event code values are described in the paragraphs below.

The process tests whether the end of the event log file has been reached, as shown by block 108. Of course, the test of block 108 will have a "NO" or "FALSE" result immediately after the process opens an event log file. In that case, control is passed to block 112, in which the process reads the next line from the event log file.

In block 113, the process determines which call number corresponds to the current line of the event log file. In the preferred embodiment, each line of the event log file stores a time value, channel value, event value, and CPU identifier values. The process can associate a particular line of the event log file with a particular call by matching the channel value in that line to the channel value associated with a call.

At block 116, the event represented by the current line is processed. After the event represented by the current line is processed in block 116, control is passed to block 108 in which the end-of-file test is repeated. If the end of the event log file has not been reached, then the steps in blocks 112 through 116 are repeated.

If the end of the event log file has been reached, then in block 117 the process determines whether the command-line invocation contains another event log file name. If so, the named file is opened and processed according to the steps of block 104 to block 116. If the process determines that the command-line invocation contains no other event log file name, then at block 118, the process of generating reports begins. Report generation is further described below in connection with FIG. 1C.

Statistical Computation and Event Processing

An embodiment processes data contained in event log files specified by the user at the time the report generator is invoked. During processing, the report generator creates various data structures to store the processed information. Reports can be generated based on the data stored in these data structures. Processing of events of an event log is described with reference to FIG. 2A through FIG. 2H.

Figure 2A:
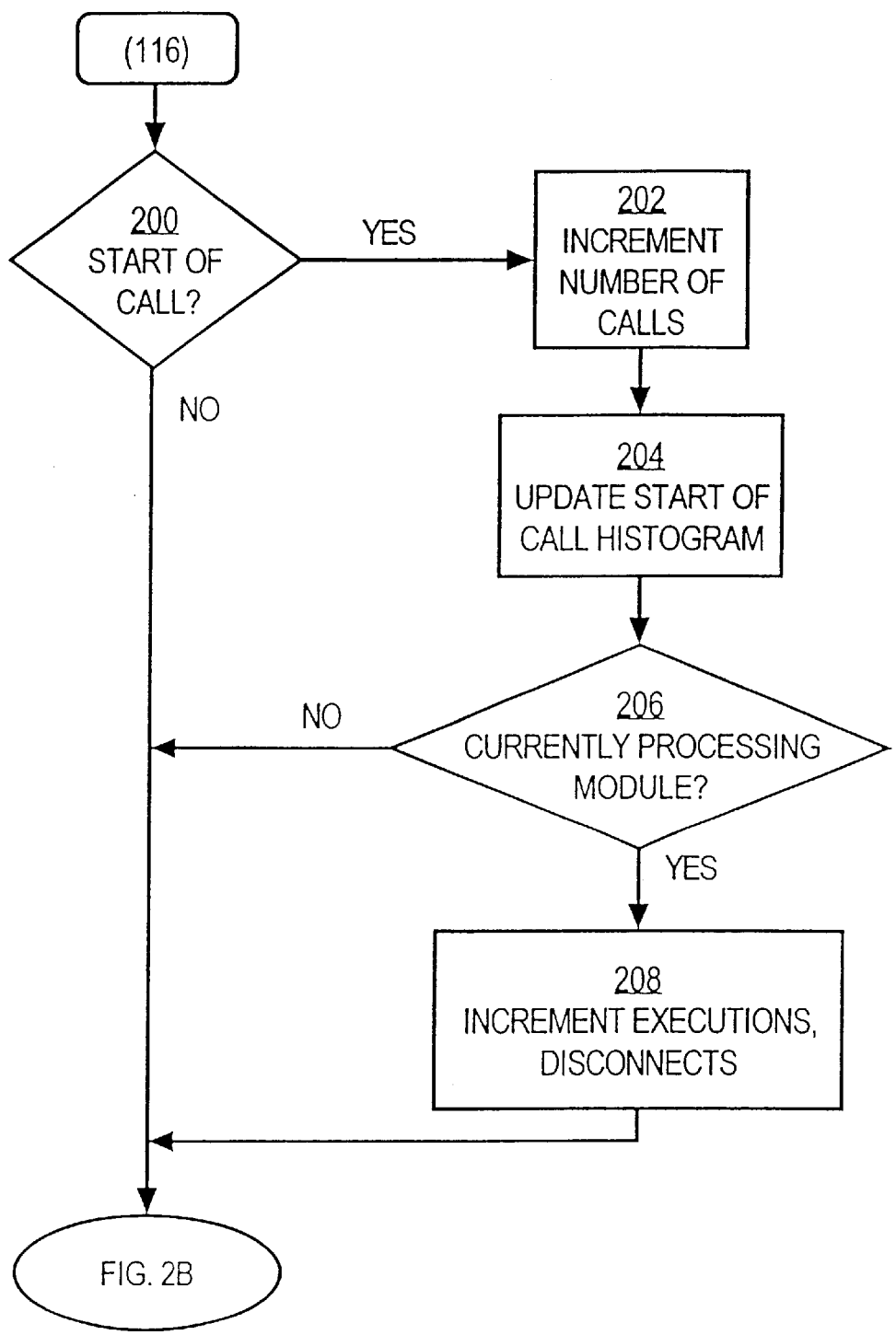
FIG. 2A is a flow diagram of processing a call initiation event.

FIG. 2A is a flow diagram of processing a call initiation event. In one embodiment, the call initiation event is a "Start of Call" event. At block 200, the process tests whether the current line that is read from the event log is a Start of Call event. If the current line from the event log is not a Start of Call event, then control passes to the next phase as shown in FIG. 2B.

Otherwise, at block 202, the process increments the number of calls. At block 204, the process updates the Start of Call histogram data, which gives a breakdown of when each call was initiated.

At block 206, the process tests if a module is currently being processed. In one embodiment, the module is a DialogModule. If a module is currently being processed, then the module abruptly ended before an event that signifies the end of a module occurred. Thus, the process increments the number of module executions and disconnections. Otherwise, control passes to the next phase as described by the flow diagram of FIG. 2B.

Figure 2B:
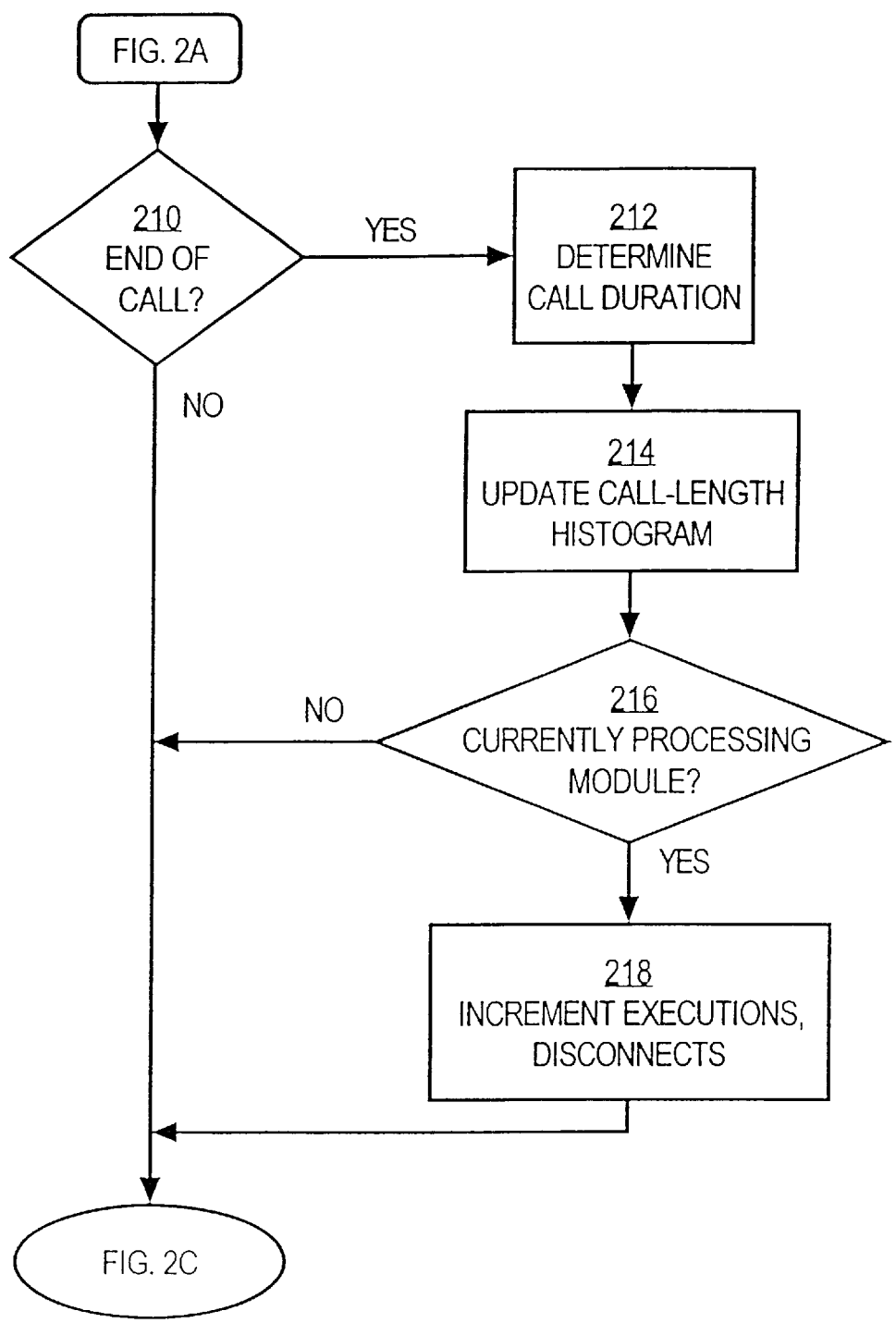
FIG. 2B is a flow diagram of processing an end of call event.

FIG. 2B is a flow diagram of processing an event that signifies the end of a call, or an "End of Call" event in the DialogModule environment. At block 210, the process tests whether the current line that is read from the event log is an End of Call event. If the process determines that the current line from the event log is not an End of Call event, then control passes to the next phase as described by the flow diagram of FIG. 2C.

Otherwise, at block 212, the process determines the call duration. At block 214, the process updates the Call-Length histogram data, which indicates the number of calls that fall within each pre-determined call duration range.

At block 216, the process tests whether a module is currently being processed. If a module is currently being processed it means that the module abruptly ended before an event, signifying the end of module, occurred. Thus, the process increments the number of module executions and disconnections. Otherwise, control passes to the next phase as described by the flow diagram of FIG. 2C.

Figure 2C:
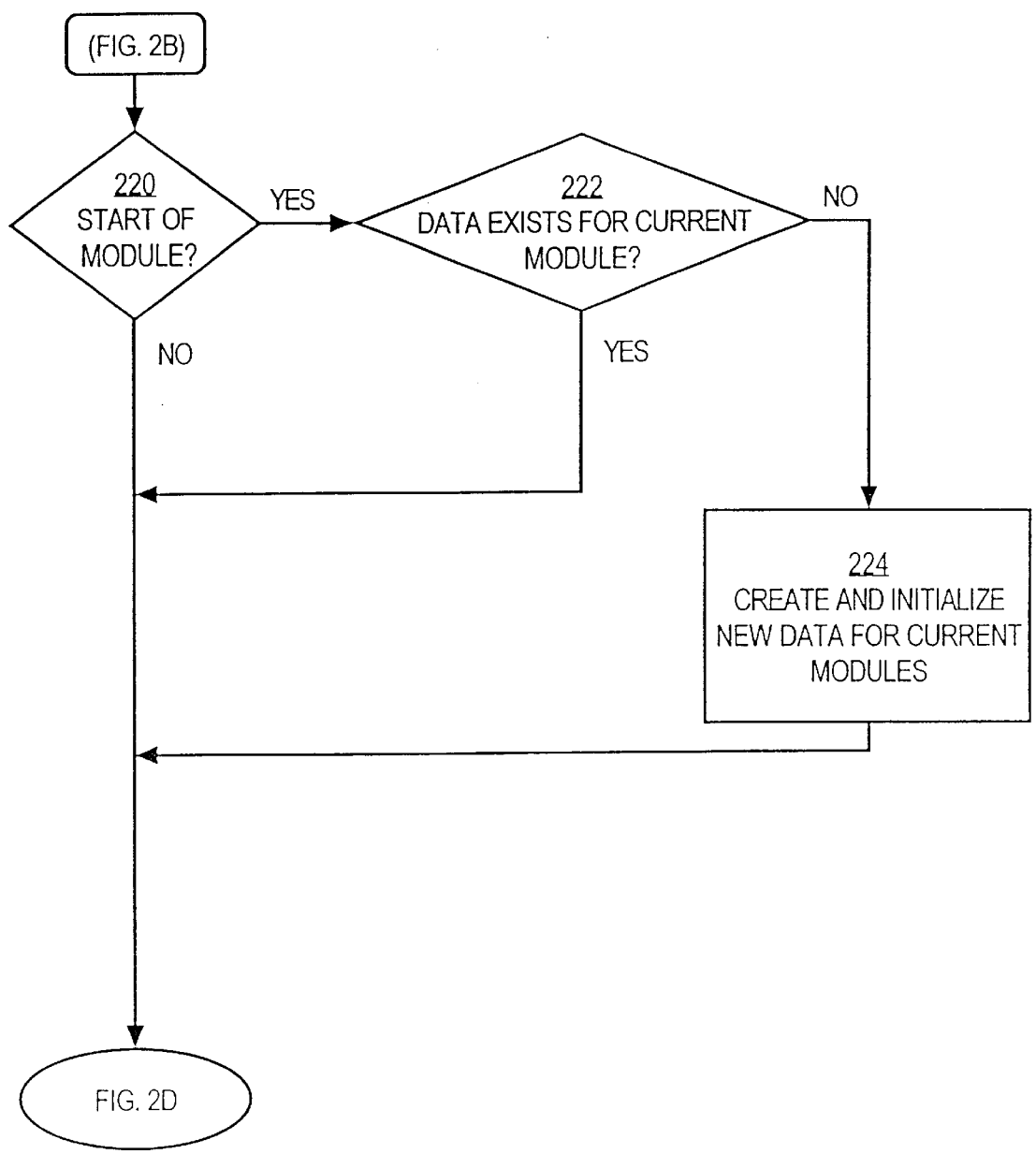
FIG. 2C is a flow diagram of processing a start of module event.

FIG. 2C is a flow diagram of processing an event that indicates the start of execution of a module, or a "Start of Module" event in the DialogModule environment. At block 220, the process tests whether the current line that is read from the event log is a Start of Module event. If the process determines that the current line from the event log is not a Start of Module event, then control passes to the next phase as described by the flow diagram of FIG. 2D.

Otherwise, at block 222, the process tests whether data already exists for the current module. If data already exists for the current module, then control passes to next phase as described by the flow diagram of FIG. 2D. Otherwise, at block 224, the process creates and initializes new data for the current module.

Figure 2D:
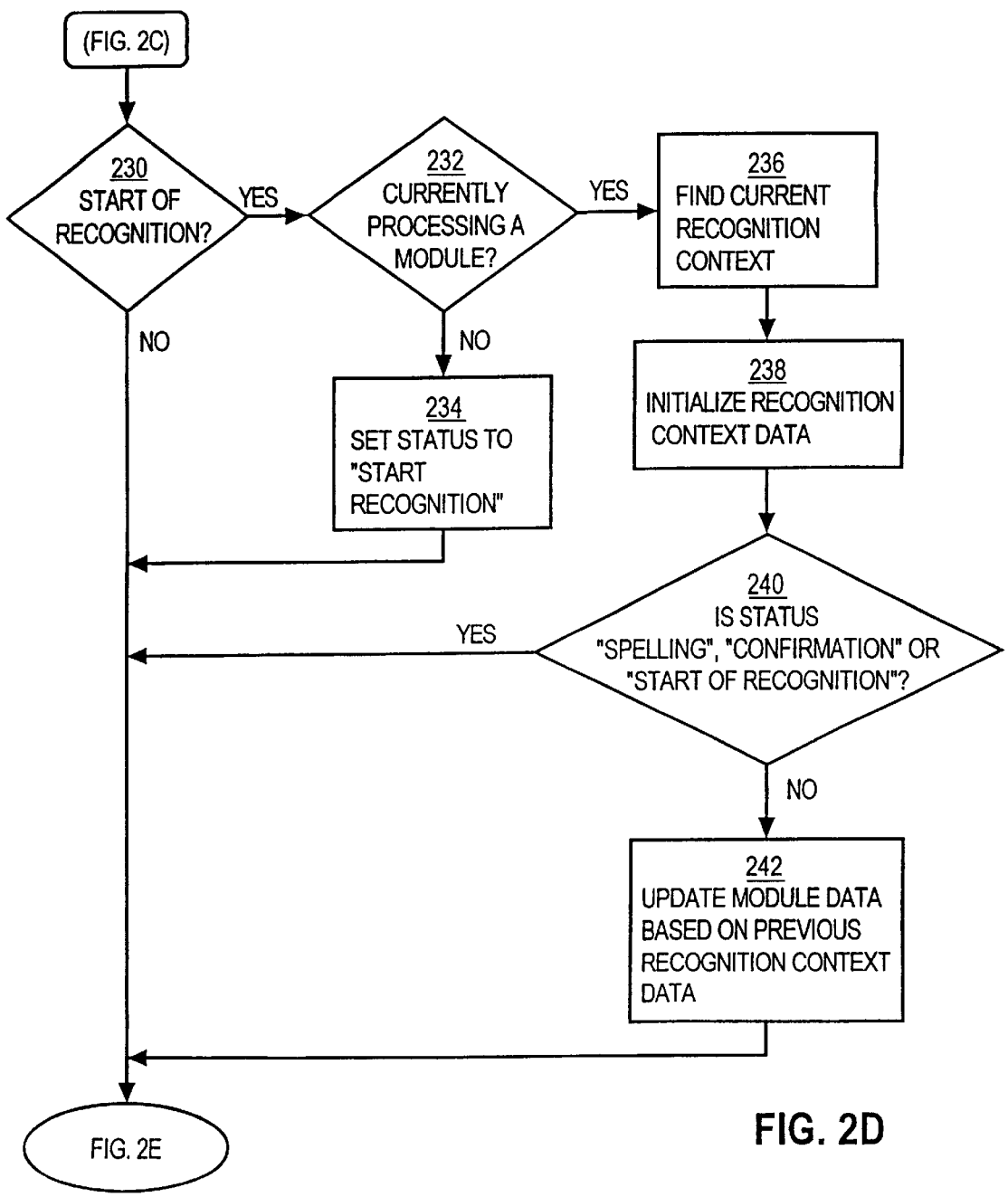
FIG. 2D is a flow diagram of processing a start of recognition event.

FIG. 2D is a flow diagram of processing an event that indicates the start of execution of a recognition context within a module, or a "Start of Recognition" event in the DialogModule environment. At block 220, the process tests whether the current line that is read from the event log is a Start of Recognition event. If the process determines that the current line from the event log is not a Start of Recognition event, then control passes to the next phase as described by the flow diagram of FIG. 2E.

If the process determines that the current line that is read from the event log is a Start of Recognition event, then at block 232, the process tests whether a module is currently being processed. If a module is not currently being processed, the process sets the status of the context to "Start of Recognition." Otherwise, at block 236, the process determines the current recognition context within the current module.

At block 238, the process initializes the data of the recognition context. If the recognition context is associated with spelling, then the status of the recognition context is set to "spelling". If the recognition context is a confirmation recognition context, then the process sets the status to "confirmation". At block 240, if it is determined that the status the recognition context is not set to either "spelling" or "confirmation", then at block 242, the process updates the data of the current module based on the previous recognition context data.

For example, the process increments the number of acceptances associated with attempts to collect primary module data from the caller when the status of the previous recognition context is "accepted". Similarly, the process increments the number of attempts at data collection that were rejected, the number of attempts at data collection that ended in an unknown status, the number of negative caller responses to confirmations, the number of affirmative caller responses to confirmations when the status of the previous recognition context is respectively, "confirmation", "rejected", "confirmed false", and "confirmed true". Also, the process increments the number of collections of caller responses.

Figure 2E:
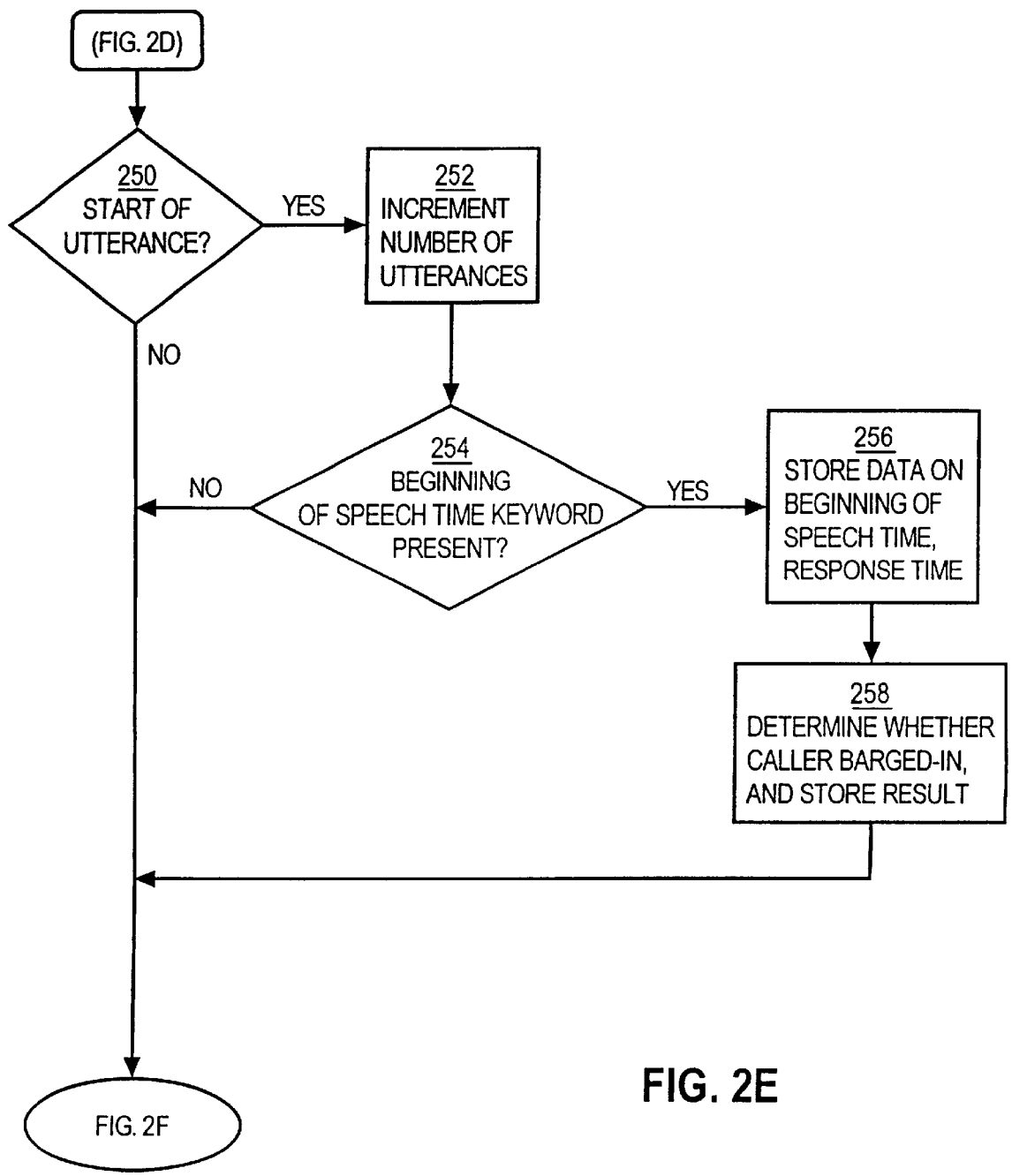
FIG. 2E is a flow diagram of processing a start of utterance event.

FIG. 2E is a flow diagram of processing an event that indicates the start of an utterance by a caller, or a "Start of Utterance" event in a DialogModule environment. At block 250, the process tests whether the current line that is read from the event log is a Start of Utterance event. If the process determines that the current line from the event log is not a Start of Utterance event, then control passes to the next phase as described by the flow diagram of FIG. 2F.

If the current line from the event log is a Start of Utterance event, then at block 252, the process increments the number of utterances. At block 254 the process tests whether a keyword indicating a beginning of speech time is present. If the keyword indicating the beginning of speech time is not present, then control passes to the next phase as described by the flow diagram of FIG. 2F. Otherwise, at block 256, the process stores data on the beginning of speech time and response time. At block 258, the process determines whether the caller barged-in and stores the result.

Figure 2F:
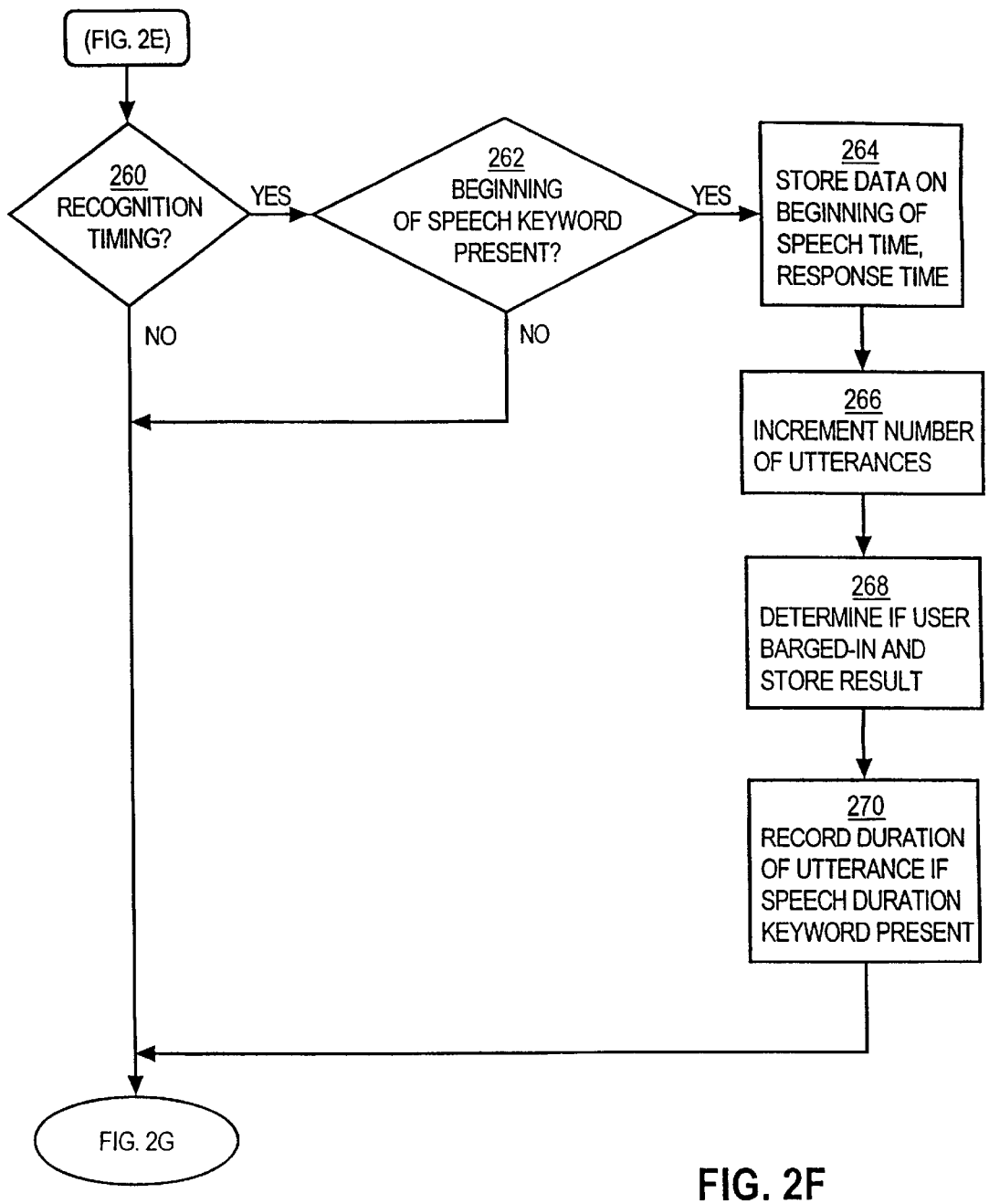
FIG. 2F is a flow diagram of processing recognition timing event.

FIG. 2F is a flow diagram of processing an event associated with the timing of utterances, or a "Recognition Timing" event in a DialogModule environment. At block 260, the process tests whether the current line that is read from the event log is a Recognition Timing event. If the process determines that the current line from the event log is not a Recognition Timing event, then control passes to the next phase as described by the flow diagram of FIG. 2G.

If the current line from the event log is a Recognition Timing event, then at block 262 the process tests whether a keyword indicating a beginning of speech time is present. If the keyword indicating the beginning of speech time is not present, then control passes to the next phase as described by the flow diagram of FIG. 2G. Otherwise, at block 264, the process stores data on the beginning of speech time and response time. At block 266, the process increments the number of utterances. At block 268, the process determines whether the caller barged-in and stores the result. At block 270, the process records the duration of the utterance if the keyword for speech duration is present. Control then passes to the next phase as described by the flow diagram of FIG. 2G.

Figure 2G:
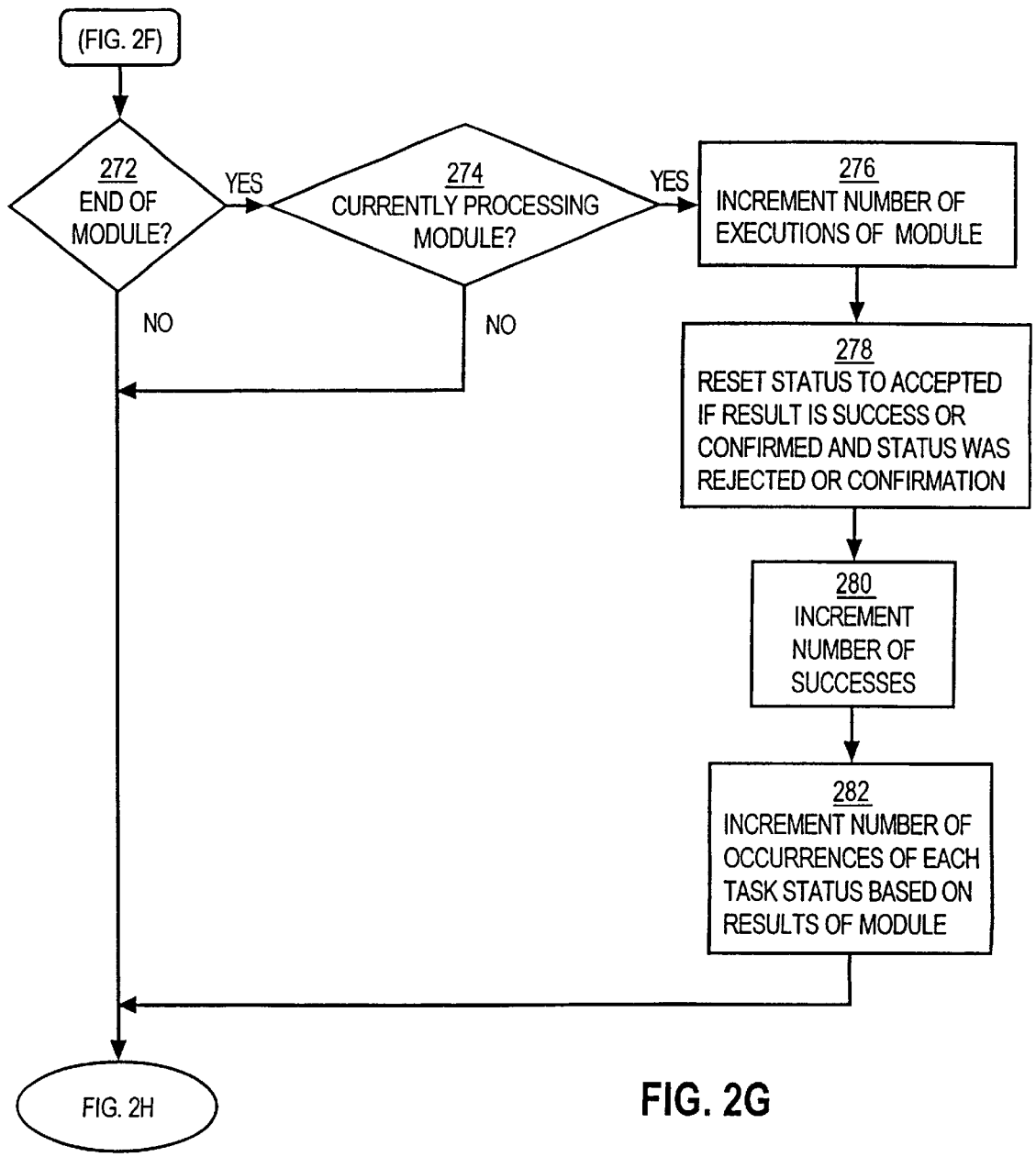
FIG. 2G is a flow diagram of processing an end of module event.

FIG. 2G is a flow diagram of processing an event that indicates the end of a module, or an "End of DialogModule" event in a DialogModule environment. At block 272, the process tests whether the current line that is read from the event log is an End of DialogModule event. If the process determines that the current line from the event log is not an End of DialogModule event, then control passes to the next phase as described by the flow diagram of FIG. 2H.

If the process determines that the current line that is read from the event log is an End of Module event, then at block 274, the process tests whether a module is currently being processed. If a module is not currently being processed, then control passes to FIG. 2H. However, if a module is currently being processed, the process increments the number of executions of the module at block 276.

At block 278, the process resets the status of the current context associated with the current module to "accepted" when any one of the following conditions is true: when there is an unconfirmed successful result for the module and the status was previously set as "rejected"; or when there is an confirmed successful result for the module and the status was previously set as "confirmed"; or when there is an unconfirmed successful result for the module and the status was previously set as "confirmed".

At block 280, the process increments the number of successes for the current module when the status of the current context is "accepted".

At block 282, the process increments the number of occurrences of each task status based on the results of the module. For example, the process increments the number of times an execution of the module ended in a command. The process increments the number of dual tone multi-frequency ("DTMF") occurrences when there is DTMF result for the module. Similarly, the process increments the number of failures, the number of disconnections, the number of halts, and the number of errors when the module results are respectively, failures, caller hang-ups, and application halts. In addition, if a vocabulary item was previously stored, then the process increments the number of times the vocabulary item has occurred. If the vocabulary item had to spelled or confirmed, then the process updates the vocabulary information on that particular vocabulary item.

Figure 2H:
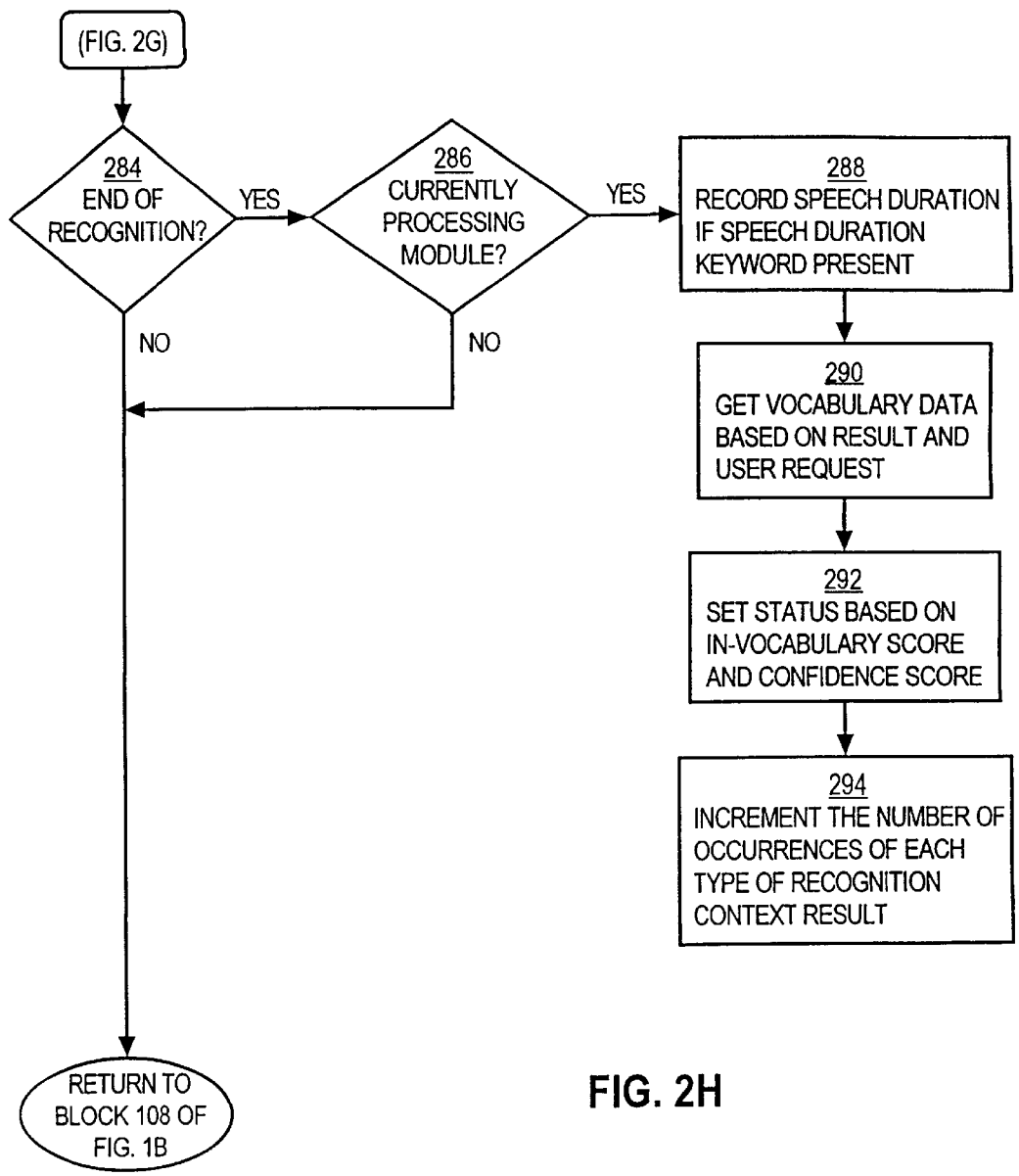
FIG. 2H is a flow diagram of processing an end of recognition event.

FIG. 2H is a flow diagram of processing an event that indicates the end of a recognition context, or an "End of Recognition" event in a DialogModule environment. At block 284, the process tests whether the current line that is read from the event log is an End of Recognition event. If the process determines that the current line from the event log is not an End of Recognition event, then control returns to block 108 of FIG. 1B.

If the process determines that the current line that is read from the event log is an End of Recognition event, then at block 286, the process tests whether a module is currently being processed. If a module is not currently being processed, then control returns to block 108 of FIG. 1B. However, if a module is currently being processed, then at block 288, the process records speech duration data if a keyword associated with speech duration is present.

At block 290, the process obtains vocabulary data based on the results of the module and the user's request. For example, the process obtains either the raw vocabulary or the translated vocabulary depending on what the user specified.

At block 292, the process sets the status of the current recognition context based on an in-vocabulary confidence score and a match-confidence score. First, the process obtains a list of vocabulary items and the corresponding in-vocabulary confidence score and match-confidence score when the recognition context result has an "ok" value. The in-vocabulary confidence score and match-confidence score are indications of how confident the recognizer is on the accuracy of the module results and are further described below. The process also increments the number of successful results for the current recognition context.

If the in-vocabulary confidence score and the match-confidence score are both greater than 600, then the process sets the status of the current recognition context to "confirmed true" or "confirmed false" depending on whether the caller affirmed the confirmation or disaffirmed the confirmation. Also, the process updates vocabulary data when the recognition context is a Voice Menu, Item List, or Yes/No, which are further described below.

If the match-confidence score is greater than 900, the process sets the status of the current recognition context to "accepted". Otherwise, the process sets the status to "confirmation".

If the in-vocabulary confidence score and the match-confidence score are not both greater than 600, then the process sets the status of the current recognition context to "rejected" and increments the number of failures when the result is "fail". The process sets the status to "rejected" if the result was not a confirmation.

At block 294, the process increments the number of occurrences of each type of recognition context result. For example, for each recognition context, the process increments the number of time-outs, aborts, errors, DTMFs, disconnections, and stops when the result of the recognition context is "time", "abrt", "err", "dtmf", "disc", and "stop" respectively. Also, the process increments the number of times the caller spoke too long when the recognition context result is "maxs".

Report Generation

Figure 1C:
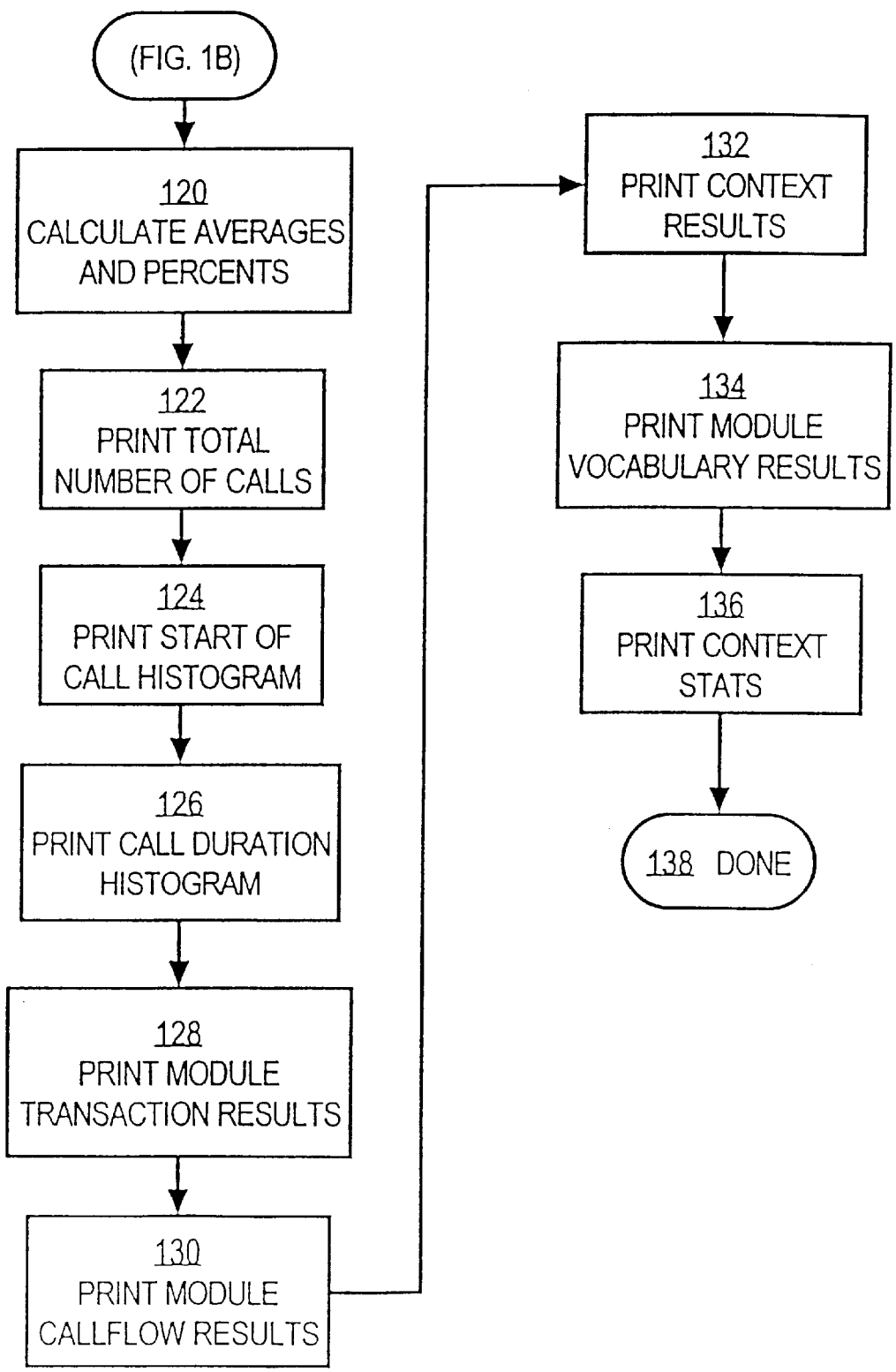
FIG. 1C is a flow diagram of a process of displaying statistical and analytical information about a call that is carried out using an interactive speech application.

FIG. 1C is a flow diagram of a process of displaying statistical and analytical information about a call that is carried out using an interactive speech application. In one embodiment, the categories of printed reports are Start of Call Histogram, Call-Length Histogram, Module Transaction Results, Module Callflow Results, Context Results, Module Vocabulary Results, and Context Stats. The description of the printed reports were previously explained above under the subheading "REPORTS AND STATISTICS". Other reports may be printed based on the information obtained from one or more event log files.

At block 120, the process calculates certain averages and percentages for each category of reports based on the information obtained from an event log file. Examples of the averages and percentages can be found in the REPORTS AND STATISTICS section above. At block 122, the process prints the total number of calls and the average duration per call.

At block 124, the process prints the Start of Call Histogram by printing the number of calls and the percentage of total calls corresponding to each hour of the day. At block 126, the process prints the Call-Length Histogram by printing the number of calls and the percentage of total calls corresponding to each pre-determined call duration range.

At block 128, the process prints the Module Transaction Results for each module by printing the Module name, the number of module executions, the percentage module executions assumed to be correct, the percentage of module executions that ended in a command, the percentage of module executions that failed, the percentage of module executions that received DTMFs, the percentage of module executions that got disconnected, the percentage of module executions that were halted, the percentage of module executions that ended in errors, and a success rate for the module.

At block 130, the process prints the Module Callflow Results for each module by printing the Module name, the number of attempts at collecting primary data, the percentage of attempts at collection that were accepted, the percentage of attempts at collection that were confirmed with a "yes", the percentage of attempts at collection that were confirmed with a "no", the percentage of attempts at collection that were rejected, the percentage of attempts at collection that ended in an unknown status, and the average number of utterances that were required to for each execution of the module.

At block 132, the process prints the Context Results for each recognition context of each module by printing the Module name, the recognition context name, the number of executions of the recognition context, the number of executions of the recognition context that were successful, the number of executions of the recognition context that failed, the number of executions of the recognition context that timed out, the number of executions of the recognition context where the caller spoke for too long, the number of executions of the recognition context that were stopped by the application, the number of executions of the recognition context where the caller hung-up, the number of executions of the recognition context that were aborted by a callback, and the number of executions of the recognition context in which an error occurred.

At block 134, the process prints Module Vocabulary Results for each module printing the Module name, the list of translated vocabulary or the list of raw vocabulary depending on user preference, the number of occurrences when an answer was received, the average number of utterances that were required to give an answer, the percentage of times the caller had to confirm the answer, the percentage of times the caller had to use the fallback mechanism, and the percentage of times that the caller had to disambiguate an answer.

At block 136, the process prints the Context Stats for each recognition context of each module by printing the Module name, the recognition context name, the number of utterances for the recognition context, the number of utterances in the recognition context as a percentage of the total number of utterances from all recognition contexts, the average duration of each utterance, the average amount of time that the recognizer took to respond, the average amount of time a caller waited before speaking, the amount of time a caller spent talking as a percentage of the total time spent in the recognition context, and the percentage of times that the caller barged in. The process of printing reports is complete at block 138.

Although the foregoing embodiment shows generating a plurality of reports in succession, individual reports may be generated without generating all others.

Identifying Calls In An Event Log File

In the preferred embodiment, a separate call listing mechanism is provided to enable a user to locate and play calls in the middle of a large event log file. The call listing program displays a summary of all calls in an event log file. In a preferred embodiment, the call listing mechanism is invoked as follows:

>listcall <event log filename>

In response, the call listing mechanism displays a line for each call. Each line includes a call number, date, start time, and channel number, in the format shown in Table 7. To use the analytical tool "showcall" for a particular call, a user may refer to the "listcall" listing and then invoke "showcall" using the appropriate call number in the call argument.

TABLE 7

| | CALL LISTING FORMAT | | |
|---|---|---|---|
| Call # | Date | Beg. Time | Channel |
| 1 | 03-05-1998 | 14:21:28.07 | 10 |
| 2 | 03-05-1998 | 14:22:35.88 | 10 |
| 3 | 03-05-1998 | 14:22:48.34 | 11 |
| 4 | 03-05-1998 | 14:23:11.38 | 10 |
| 5 | 03-05-1998 | 14:23:18.50 | 11 |
| 6 | 03-05-1998 | 14:24:33.35 | 10 |
| 7 | 03-05-1998 | 14:25:46.94 | 10 |
| 8 | 03-05-1998 | 14:27:05.66 | 10 |
| 9 | 03-05-1998 | 14:28:14.87 | 10 |

Event Log Format

The preferred process operates on data saved from previous caller interactions with an interactive speech application. When running, an application can save a log of events that occurred during its execution as well as the audio data of a caller's speech.

Preferably, the performance tuning process described above operates in conjunction with a modular development environment in which event logging may be turned on or off.

To enable event logging, a user sets an ALTSLEE_LOG_FILE configuration parameter to a filename representing a file where the user wants event data to be saved. To enable audio data to be saved, the user sets an ALTSLEE_WAVE_CAPTURE parameter to ALL, which causes the system to save all data. Alternatively, the wave capture parameter may be set to FAIL, to only save failed data. The user may also set an ALTSLEE_WAVE_PREFIX parameter to the directory where the user wants the data to be written.

When event logging is active, the interactive speech application writes data to non-volatile storage, such as disk, at a rate of approximately 5 Kbytes per minute of phone call. The application writes audio data in 8-bit μ-law format, at the rate of 8,000 samples per second of speech. An average application stores about 72 Kbytes per minute of a call, if all the audio data is saved.

Preferably, each event log file consists of one or more "event records" terminated by newline characters. Each event record contains one or more keyword/value pairs, or "tokens", separated by the "|" character. Keywords are separated from their values by the "=" character. The first "=" character encountered, scanning left to right within a token, delimits the keyword and value; the value may contain additional "=" characters. If a keyword or value contains "|" characters, they are quoted by inserting an additional "|" character to form the sequence "||" Keywords may not contain the "=" character.

The maximum size of an event record is 10 kilobytes.

The event log provides the following tokens automatically for each event:

| Keyword | Value Description |
| --- | --- |
| TIME | Time-the time the event was written, in the format YYYYMMDDhhmmssmmm. |
| CHAN | Channel-the session identification name passed to AllocateDM(). For some hardware, this is an integer corresponding to the channel being used. |
| EVNT | Event code (see below). Event codes are limited to 8 characters; longer event names are truncated. Event codes may have a prefix such as "ALT". |
| UCPU | User CPU-the current running value of "user" CPU time consumed from the start of the current call. This value is reported in milliseconds. The start time is marked from when AllocateDM() is called. |
| SCPU | System CPU-the current running value of "system"CPU time consumed from the start of the current call. This value is reported in milliseconds. The start time is marked from when AllocateDM() is called. |

In each record, the TIME, CHAN, and EVNT tokens are logged first, followed by any event-specific tokens, and finally the UCPU and SCPU tokens. All time-related tokens log times in millisecond units.

The following tokens are defined for specific events. Detailed descriptions of each appear below. By convention, all event codes are lowercase (apart from the "ALT" prefix), and all keywords are uppercase.

ALTsvst—Service Start. The ALTsvst event is logged at the start of a call, via the AllocateDM( ) subroutine.

ALTsvnd—Service End. The ALTsvnd event is logged when a call completes, via the FreeDM( ) subroutine.

ALTdtst—Dialog Task Start. The ALTdtst event is logged when a Dialog Task begins execution.

| Keyword | Value Description |
| --- | --- |
| DMTP | Dialog Module Type-one of the following:<br>ALNM Alphanumeric<br>CURR Currency<br>DATE Date<br>DIGT Digits<br>ILST ItemList<br>PHON Phone<br>SPEL Spelling<br>VMNU VoiceMenu and DigitsMenu<br>YSNO YesNo<br>ZIP ZipCode |
| DTNM | Dialog Task Name as specified in the Service configuration file and in the Dialog Module Subroutine. |
| HIST | Unique name for history logging from the subroutine entry form |

ALTdtnd—Dialog Task End. The ALTdtnd event is logged whenever a Dialog Task completes. There is always one of these events for every Dialog Task Start.

| Keyword | Value Description |
| --- | --- |
| TSTT | Task Status-one of the following:<br>Confirmed — The task was completed successfully and confimed to be correct by the caller.<br>Success — The task was completed successfully, but the result was not confirmed.<br>Command — Command returned.<br>DTMF — DTMF returned to application.<br>Failure — After exhausting all configured retries and fallbacks, no valid result was obtained.<br>Hung up — The caller hung up during the task.<br>System Error — A resource or other failure occurred before the task could be completed.<br>Halted<br>Out of Memory<br>Fatal System Error |
| TRTT | Task Result-the result (string value) returned by the Module. Only returned in the case of Confirmed or Success; absent for all other return values. |

The following tokens summarize the Dialog Task errors.

| Keyword | Value Description |
| --- | --- |
| NUMT | Number to timeouts |
| NUMR | Number of retries |
| NUML | Number of no-answer or low-confidence recognitions. Does not appear for YesNo modules. |
| NUMW | Number of wrong answer recognitions. Does not appear for YesNo. |
| NUMC | Number of confirmations. Does not appear for YesNo. |
| NUMN | Number of N-Best backups. Does not appear for YesNo. |
| WDIS | Whether disambiguation was used. Appears only for ItemList. |
| WSPL | Whether spelling was used. Appears only for ItemList. |

ALTprst—Prompt Start. The ALTprst event is logged when a Dialog Task requests that a prompt be played to the caller.

| Keyword | Value Description |
| --- | --- |
| PRID | Prompt Id (i.e., message number) |
| PRNM | Prompt name-logical name of the prompt played as specified In the Prompt configuration file. |
| VSET | Voice set name (required to uniquely identity the prompt file) |

ALTrcst—Recognition Start. The ALTrcst event is logged as soon as the recognition engine begins listening for barge-in or an utterance.

| Keyword | Value Description |
|---------|-------------------|
| RCNM | Context name as specified in the configuration tile. |
| ROLE | The context "role". One of the following:<br>Collection — The original collection for this dialog task.<br>Confirmation — Confirmation context.<br>Disambiguation — Disambiguation context.<br>Fallback — Spelling fallback context. |
| LPNM | Identifies which time through the context this is. On each different iteration, the probabilities for individual words may be altered. Possible values are: 'Initial', 'Timeout1', 'Timeout2', . . . , 'Retry1', 'Retry2', . . . |

ALTutst—Utterance Start. The ALTutst event is logged as soon as the recognition engine detects that the caller is speaking. It is only logged if speech is detected.

ALTrctm—Recognition Timings. The ALTrctm event is logged by the recognition engine when recognition timing results are available for an utterance.

The ALTrctm event is only logged if the recognition status is ok or fail (see the RSTT token described below).

ALTrcnd—Recognition End. This event is logged when recognition results are available for an Utterance. There is always one of these for every recognition start.

| Keyword | Value Description |
|---------|-------------------|
| UTTC | Utterance Count-a count to the number to Utterances processed during this call |
| RSTT | Recognition Status#ne of the following:<br>ok — at least one possible result returned<br>fail — speech detected, but no possible results returned<br>time — no caller speech detected before start-of-speech timer expired<br>maxs — utterance duration was greater than the allowed maximum<br>abrt — aborted by a callback<br>stop — recognizer was halted by application<br>err — a resource or other retryable failure occurred before recognition could be completed<br>serr — a fatal system error occurred; no more recognition will succeed until process restarted |

| Keyword | Value Description |
|---------|-------------------|
| BTIM | Begin Speech Time-Milliseconds from when the recognition started (approximately the time of the ALTrcst event) until start of speech was detected. |
| BRGN | Barged-In-Y if caller barged in while a prompt was playing; N otherwise. |
| SSTM | Start-of-Speech Time-Milliseconds of silence after the previous prompt completed before the caller began speaking. If the Dialog Module did not play the previous prompt, this timer starts at the later of when the Dialog Task started or when it detected silence on an outgoing channel. Present only if BRGN is N. |
| EOST | End Of Speech Time-a timestamp, relative to the time to the ALTutst event, corresponding to when the end of caller speech was detected. |
| EODT | End Of Data Time-a timestamp, relative to the time of the ALTutst event, corresponding to the arrival of the last piece of data from the system hardware. |
| EOFPT | End Of Forward-Pass Time-a timestamp, relative to the time of the ALTutst event, corresponding to when the forward-pass Viterbi search is finished. |
| EOMRLT | End of Master Recognition Loop Time-a timestamp, relative to the time of the ALTutst event, corresponding to the completion of the Viterbi search and the system hardware cleanup. |
| EORT | End of Recognition Time-a timestamp, relative to the time of the ALTutst event, corresponding to completion of the recognition task. |
| BORT | Begin of Recognition Time-a timestamp, relative to the time of the ALTutst event, corresponding to when a recognition resource was first available to begin processing caller speech. |
| BOPS | Begin of Processed Signal-a timestamp, relative to the point where speech is detected in the incoming signal, corresponding to the start of caller speech. Note that this timestamp is always negative, since speech is always detected some time after it actually begins. |
| EEOS | Estimated End of Speech-a timestamp, relative to the point where speech is detected in the incoming signal, corresponding to the estimated end of caller speech. The estimated end of caller speech always occurs before the actual end-of-speech is detected, since a certain amount of silence must be seen before the recognition engine can be sure that caller speech is finished. |
| EOPS | End of Processed Signal-a timestamp, relative to the point where speech is detected in the incoming signal, corresponding to the end of the speech samples that are actually processed by the recognition engine. |
| EOSS | End of Speech Signal-a timestamp, relative to the point where speech is detected in the incoming signal, corresponding to the detected end of caller speech. |
| DURS | Speech Signal Duration-duration of speech signal, including Start-of-Speech and End-of-Speech padding. This is the speech that the recognizer actually processes. |
| CPRT | Caller-Perceived Response Time-duration from estimated end of caller speech to end of recognition processing. |

-continued

| Keyword | Value Description |
|---------|-------------------|
| NBST | Number of results-Count of N-Best results returned. Returned only for status of ok or fail. |
| RDEC | Recognition decision upon exit of dialog task. Although the recognizer returns one or more answers, the Module decides whether or not to accept the answers based on predefined confidence score criteria. This logs the result of that decision. One of the following:<br>accept  Answer accepted without confirmation<br>reject   User rejected all confirmations<br>confirm Answer accepted after confirmation<br>fail     No result returned |

The following tokens are returned for each of the N-Best results, up to a maximum of the event record size limit, in the ALTrcnd event record:

| Keyword | Value Description |
|---------|-------------------|
| RSLT | Result-ASCII sting corresponding to phrase recognized as a possible match to utterance. This is after "canonicalization" and synonym mapping. |
| RAWT | Raw Text-ASCII string corresponding to the actual text recognized, before any post-processing. |
| CONF | Match Confidence-An indication of how confident the recognizer is that the result is correct, assuming that the utterance is valid in the vocabulary of the context at all. Values range from 1 to 999, where higher numbers indicate higher confidence. Unlike the Raw Score, these values are roughly comparable across contexts. |
| INVC | In Vocabulary Confidence-An indication of how much more confident the recognizer is that the result is correct versus that it is outside the vocabulary of the context. Values range from 1 to 999, where higher numbers indicate higher confidence. Unlike the Raw Score, these values are roughly comparable across contexts. |
| RAWS | Raw Score-the raw confidence score for the result (−32767 to 32768); higher numbers for a single context indicate higher confidence, but scores are not comparable across contexts. |

ALTdtut—Dialog Task Utterance Decision. The fundamental block within each Module is a question followed by one or more confirmations. The ALTdtut event logs the results during this process. This shows decisions made internal to the execution of a dialog task.

| Keyword | Value Description |
|---------|-------------------|
| DCSN | Utterance decision. A list of the values and their meanings appears below. Those items with an 'x' also set the HYPO token.<br>    certain    x  Accepted item with high confidence<br>    accepted  x  Accepted item without confirming<br>    confirmed x  User confirmed item during confirmation<br>    rejected  x  User rejected item during confirmation<br>    command  x  User exited confirmation saying a command<br>    failed      Could not confirm utterance |
| HYPO | The confirmation value. |

ALTdtcf—Dialog Task Call Flow Decision. This event describes major decisions made during the intra-Module callflow. The exact values of this token may differ depending on the specifics of the callflow. For example, only ALTdmItemList may disambiguate or apply fallback.

| Keyword | Value Description |
|---------|-------------------|
| DCSN | Intra-Module callflow decision. A list of the current values and their meanings appears below.<br>    finish         Data collected; ending module<br>    retry          Repeat same section<br>    disanibiguate  The recognized item requires disambiguation<br>    fallback       Recognition attempts failed, resorting to fallback<br>    max retries    Maximum retries exceeded, exiting<br>    max timeouts  Maximum timeouts exceeded, exiting<br>    aborting       Event or error (see ALTdtnd for reason) |

ALTwcap—Waveform Captured. This event is logged whenever an application saves a waveform to a file for off-line analysis as a result of the current settings (ALL waveforms, FAILED only, or NONE). This event immediately follows the Recognition End event during which the waveform was captured.

| Keyword | Value Description |
|---------|-------------------|
| FNUM | File Number-a combination of a five digit number (with leading zeros) and the session name, appended to the end of the ALTSLEE_WAVE_PREFIX registry value, comprising the file name in which the waveform data was stored. |

The following example describes an event log file that may be generated and stored for a hypothetical interactive speech application. The example application uses a processing module that handles item lists. Assume that the example application uses an ALTech Vocabulary Format (AVF) file as shown in Table 8 and implements or is an element of an auto-attendant system. In the AVF file, the word 'bill' is ambiguous, and two similar words appear. This example shows only the tokens pertaining to dialog task decisions; other tokens, such as service start, prompt start, etc. are omitted for clarity of this example.

TABLE 8

AVF FILE CONTENTS

| | |
|---|---|
| bill | 224 |
| bill | 223 |
| bill o'farrell | 223 |
| bill ledingham | 224 |
| billy ledingham | 224 |
| phil | 303 |
| will | 223 |

Assume also that each time the caller is asked for information, one or more timeouts may occur. As long as the maximum number of timeouts is not reached, the user is re-prompted.

Assume now that while executing for a hypothetical call, the example application generates the following audible prompts and events shown in Table 9

TABLE 9

EXAMPLE EVENT LOG ENTRIES--PART 1

| PROMPT | CALLER | EVENT LOG ENTRY |
|---|---|---|
| Welcome to Altech. Please say the name of the person with whom you wish to speak? | <silence> | ALTrcst\|ROLE=Collection\| LPNM=Initial ALTrcnd\|RDEC=fail |
| I couldn't hear you. Please say the name of the person again. | <garbled> | ALTrcst\|ROLE=Collection\| LPNM=Timeout1 ALTrcnd\|RDEC=reject ALTdtut\|DCSN=failed ALTdtcf\|DCSN=retry |

At this point, the application or task needs to make a decision. Should it attempt to collect understandable audio against, resort to a fallback strategy, or exit the current module with a failure flag set? Assume that collection of audio is re-attempted. The event log will contain the information set forth in Table 5.

TABLE 10

EXAMPLE EVENT LOG ENTRIES--PART 2

| Please say the name one more time. | bill | ALTrcst\|ROLE=Collection\| LPNM=Retry1 ALTrcnd\|RDEC=confirm |
|---|---|---|
| I think you said <prompts/ PrinceOfHeck.ulaw>. Is that correct? | <garbled> | ALTrcst\|ROLE= Confirmation\|LPNM=Initial ALTrcnd\|RDEC=fail |
| I couldn't tell whether you said 'yes' or 'no'. I think you said <prompts/PrinceOfHeck.ulaw>. Is that correct? | no | ALTrcst\|ROLE= Retry1 ALTrcnd\|RDEC=accept ALTdtut\|DCSN=reject\| HYPO=bill |
| Maybe it was <prompts/ WilliamOFarrell.ulaw>? | no | ALTrcst\|ROLE= Confirmation\|LPNM=Initial ALTrcnd\|RDEC=accept ALTdtut\|DCSN=reject\| Hypo=bill o'farrell ALTdtcf\|DCSN=retry |

At this point, the example application that it heard something, but the user rejects each choice during confirmation. Again, the application needs to make a decision about what to do next. Assume that it elects to retry, but the recognition context is different than during the initial collection. Since the user has rejected 'phil' and 'will', these options are disallowed from the original vocabulary. The event log file will contain the information set forth in Table 11

TABLE 11

EXAMPLE EVENT LOG ENTRIES--PART 3

| Please say the name of an ALTech employee now. | bill | ALTrcst\|ROLE=Collection\|LPNM= Retry2 ALTrcnd\|RDEC=accept ALTdtut\|DCSN=certain\|HYPO=bill ALTdtcf\|DCSN=disambiguate |
|---|---|---|

This time, the application recognized 'bill' with a very high confidence value. The vocabulary item "bill" is ambiguous, so the application proceeds with disambiguation. The event log file will contain the information set forth in Table 12.

TABLE 12

EXAMPLE EVENT LOG ENTRIES--PART 4

| We have more than one <prompts/Bill.ulaw>. Which do you mean? | bill o'farrell | ALTrcst\|ROLE=Disambigua- tion\|LPNM=Initial ALTrcnd\|RDEC=accept |
|---|---|---|
| Did you say <prompts/BillO.ulaw>? | yes | ALTrcst\|ROLE=Confirmation\| LPNM=Initial ALTrcnd\|RDEC=accept ALTdtut\|DCSN=confirmed\| HYPO=bill o'farrell |

The application proceeds smoothly through disambiguation and now has a unique, unambiguous result. The application must now decide what to do next. In a more complex module or application, the application might move to the next step and ask something like 'Who should I say is calling?'. Since the current task is an Item List task, however, the extension 223 is returned from the module and the call is transferred. The following information is stored in the event log file: ALTdtcf|DCSN=finishALTdtnd|TSTT= Confirmed|TRTT=223| . . .

Call Browser

In an alternate embodiment, the invention provides a call browser. Preferably this embodiment is carried out in the context of a development environment for interactive speech applications. The development environment displays an interactive speech application under development in the form of one or more interconnected modules. A user may select a module, for example, by moving a mouse-operated cursor to the module and double-clicking on a mouse button. In response, the call browser displays information on contexts, enables the user to listen to rejected utterances, and offers other functions.

In yet another alternate embodiment, the call browser includes one or more agent processes that can read an event log file and make development suggestions to the user. For example, an event process reads an event log file, analyzes its contents, and displays the suggestion "reduce the high-confidence threshold value at module X" or "voice menu choice Y has a higher utterance/execute value than others—you should examine its pronunciation."

DEVELOPMENT SYSTEM CONTEXT

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for improving performance of an interactive speech application. According to one embodiment of the invention, improving performance of an interactive speech application is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for improvement of an interactive speech application as described herein.

The received code may be executed by processor 304 as it is received, and/or stored in storage device 310, or other non-volatile storage for later execution. In this manner, computer system 300 may obtain application code in the form of a carrier wave.

Additional details of exemplary components of a computer system suitable for speech systems are described in G. Pelton, "Voice Processing" (New York: McGraw-Hill, 1993), ISBN 0-07-049309-X, Chapter 8 ("Development Software").

According to one embodiment of the invention, an interactive speech application is developed and executed using software running on a general purpose computer system such as computer system 300. In alternative embodiments, special purpose hardware may be used in place of or in combination with software instructions to implement the invention. Thus, embodiments of the invention are not limited to any specific combination of hardware circuitry and software.

Development System

FIG. 4 is a functional block diagram of a system 400 for developing interactive speech applications. As used herein, a "Service" 410 is a customized interactive speech application developed to perform one or more dialogue tasks to provide a user-defined service. An example of a Service is the application described for receiving and routing an incoming call.

An application developer creates a Service 410 defining a call flow in a runtime Service Execution Environment 420 which may be a default environment provided to the developer or a customized environment created or modified for the specific Service 410. In this embodiment, the Service Execution Environment 420 provides a program function that executes the Service 410, which is configured as a dynamically linked library (DLL).

The call flow of the Service 410 describes its interactive conversation with callers using function calls to one or more "instances" of software modules from the Dialogue Modules 430. The system 400 comprises a plurality of Dialogue Modules, each of which performs a specific speech-processing task. Example tasks include outputting a prompt, identifying the caller's speech as a recognized item of a predefined list, identifying the caller's speech as an affirmative or negative (Yes/No) response, or identifying strings of characters spelled by the caller. In the embodiments described herein, each Dialogue Module is implemented as a generic template that is a function, method, object, or subroutine. A programming language such as C++ may be used.

A developer interconnects instances of the Dialogue Modules to perform dialogue tasks within a Service 410. Each Dialogue Module may use default configuration parameters or may be customized for a specific Service 410. Parameters of a Dialogue Module instance may be customized to, for example, output customized prompts, recognize customized vocabularies in response to prompts, enable or disable specific features, and set a variety of additional parameters.

Dialogue Modules 430 provides an interface between the Service 410 and the Speech Output Components 440 and Speech Input Components 450, which perform functions enabling the system 400 to handle output and input audio signals. By providing the interface, the Dialogue Modules 430 allows a developer to develop a Service 410 without a detailed understanding of the Speech Output Components 440 and Speech Input Components 450, whose functions include outputting prompts to callers and receiving and processing input speech from callers. Any number of Speech Output Components 440 and Speech Input Components 450 may be included in the system 400.

In the embodiment illustrated in FIG. 4, the Speech Output Components 440 output speech prompts (or other audio signals) through the Telephony Interface Components 460. In some cases, the Speech Output Components 440 may simply execute a specified audio file to output prerecorded speech. Alternatively, the Speech Output Components 440 may include a speech synthesis system, such as DECtalk™, a text-to-speech synthesizer that is available from Digital Equipment Corporation for converting text to speech. Commercially available speech synthesizers typically include a pronunciation dictionary and a speech generator to interpret an input text string, determine a pronunciation, and generate and output a speech waveform. Additionally, Speech Output Components 440 may include software to output an audio signal such as a beep when the prompt is finished playing, intended to notify callers that they should begin speaking. The Speech Output Components 440 may also include software to stop the output of a prompt if caller speech is detected, thereby providing "barge-in" detection and handling. Details of barge-in detection and handling are explained, for example, in U.S. Pat. No. 5,765,130, entitled "Method and Apparatus for Facilitating Speech Barge-In In Connection With Voice Recognition Systems."

The Speech Input Components 450 receive, record, and process incoming speech signals received through the Telephony Interface Components 460 during execution of a Service. Speech Input Components 450 typically include a Speech Recognition Engine such as that provided in SpeechWorks™, available from Speechworks International, Inc. of Boston, Mass., for recording, digitizing, and processing speech input. The Speech Recognition Engine, using additional components such as acoustic models for determining a phonetic representation of an input spoken word, database components for determining possible matches to entries in specified databases accessible to the Engine, and confidence correlation components for determining the confidence in hypotheses of possible matches, generates a textual representation of incoming speech signals received from callers. The Engine has natural language modeling information, such as grammar rules of languages of speech it is intended to recognize.

The Telephony Interface Components 460 include components such as telephony cards providing telephony interface/voice boards for communicating over telephone lines, call channels for handling multiple calls on the telephone lines, an audio player/recorder for outputting prompts to callers and recording incoming speech from callers, and other components as needed to output and receive speech signals to and from callers, as well as software libraries to control the components.

The Service 410, including its Dialogue Module instances and their underlying Speech Output Components 440 and Speech Input Components 450 and Telephony Interface Components 460, operates within the runtime Service Execution Environment 420. As noted above, in this embodiment, the Service 410 is configured as a dynamically linked library (DLL) and is executed by being called by the Service Execution Environment 420 which provides the top level ("main( )") function. Additional software code is provided in a library to handle calls to Dialogue Module instances and other globally used functions.

In general, the Service Execution Environment 420 will invoke the Service 410 at three times: service initialization, service execution (processing incoming calls), and service clean up (after processing calls). Examples of functions the Service Execution Environment 420 can be configured to process include: initializing the telephony interface; initializing the interfaces to the Speech Output Components 440 and Speech Input Components 450 and Dialogue Modules 430; invoking user-provided service initialization routines, if necessary; waiting for an incoming call; determining a telephony channel; invoking user-provided service execution routines; ensuring disconnection of completed calls; and invoking cleanup routines, including user-provided service cleanup routines, Dialogue Module cleanup routines, and hardware/telephony resources cleanup routines.

Extensions and Variations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating information useful in improving performance of an interactive speech application program, the method comprising the steps of:

receiving, from an event log that is generated by the interactive speech application during a call from a caller, one or more event values associated with one or more calls, wherein each of the event values describes a task carried out by the interactive speech application during the call and in response to interaction with the caller; and generating a statistical summary of the performance of the interactive speech application based on the event values.

2. A method as recited in claim 1, further comprising the step of modifying one or more parameters of the interactive speech application, to improve its performance, based using the statistical summary.

3. A method as recited in claim 2, wherein generating a statistical summary further comprises:

reading a current event value from the event log;

determining an identity of a call associated with the current event value;

processing call information values associated with the current event value to produce statistical data associated with each call;

iteratively repeating the reading, determining, and processing steps until all the events in the event log have been processed; and creating the statistical summary based on the statistical data.

4. A method as recited in claim 3 wherein processing call information values further comprises creating and storing call initiation data for reporting on call initiation of each call when the current event is a Start of Call event.

5. A method as recited in claim 3 wherein processing call information values further comprises determining whether any module data exists for a current module associated with a Start of Module event when the current event is the Start of Module event.

6. A method as recited in claim 5 wherein determining whether any module data exists for a current module further comprises:

creating and storing a new module data element when no module data exists for the current module; and initializing the new module data element with current module information.

7. A method as recited in claim 3 wherein processing call information values further comprises determining recognition context data when the current event is a Start of Recognition event.

8. A method as recited in claim 7 wherein determining recognition context data further comprises:

determining a current recognition context value based on the event log;

initializing the recognition context data using the current recognition context value;

updating the current module data based on a previous recognition context value when the current recognition context has a status value that is not Spelling, Confirmation or Start of Recognition; and setting the status value of the current recognition context to Start of Recognition.

9. A method as recited in claim 8 wherein updating the current module data based on a previous recognition context value further comprises incrementing a value representing a number of acceptances associated with attempts to collect primary module data from the caller when the previous recognition context is Accepted.

10. A method as recited in claim 8 wherein updating the current module data based on a previous recognition context value further comprises incrementing a value representing a number of unknowns associated with attempts to collect primary module data from the caller when the previous recognition context is Confirmation.

11. A method as recited in claim 8 wherein updating the current module data based on a previous recognition context value further comprises incrementing a value representing a number of rejections associated with attempts to collect primary module data from the caller when the previous recognition context is Rejected.

12. A method as recited in claim 8 wherein updating the current module data based on a previous recognition context value further comprises incrementing a value representing a number of negative caller responses to confirmations associated with attempts to collect primary module data from the caller when the previous recognition context is Confirmed False.

13. A method as recited in claim 8 wherein updating the current module data based on a previous recognition context value further comprises incrementing the number of collections of caller responses.

14. A method as recited in claim 3 wherein processing call information values further comprises updating timing information associated with the current recognition context when a Beginning of Speech keyword is present and when the current event is a Start of Utterance event.

15. A method as recited in claim 1 wherein generating the statistical summary further comprises generating a report describing transaction results for each module of the interactive speech application.

16. A method as recited in claim 15 wherein generating a report of transaction results further comprises, for each module of the interactive speech application, creating and displaying a success rate value based on a sum of a percentage of transactions assumed to be correct and a percentage of transactions that ended in a command divided by the sum of the percentage of transactions assumed to be correct and a percentage of transactions that ended in the command and a percentage of transactions that failed.

17. A method as recited in claim 1 wherein generating the statistical summary further comprises generating a report of results of attempts to collect primary module data from the caller.

18. A method as recited in claim 17 wherein generating a report of results of attempts to collect primary module data further comprises, for each module of the interactive speech application, creating and displaying the percentage of attempts that were accepted, confirmed true, confirmed false, and rejected.

19. A method as recited in claim 1 wherein generating the statistical summary further comprises generating a report describing recognition context results.

20. A method as recited in claim 1 wherein generating the statistical summary further comprises generating a report describing context statistics.

21. A computer-readable medium for generating information useful in improving performance of an interactive speech application program and carrying one or more sequences of instructions which, when executed by one or more processors, cause the one or more processors to carry out the steps of:

receiving, from an event log that is generated by the interactive speech application during a call from a caller, one or more event values associated with one or more calls, wherein each of the event values describes a task carried out by the interactive speech application during the call and in response to interaction with the caller; and generating a statistical summary of the performance of the interactive speech application based on the event values.

22. The computer-readable medium of claim 21, further comprising the step of modifying one or more parameters of the interactive speech application, to improve its performance, based using the statistical summary.

23. The computer-readable medium of claim 22, wherein generating a statistical summary further comprises:

reading a current event value from the event log;

determining an identity of a call associated with the current event value;

processing call information values associated with the current event value to produce statistical data associated with each call;

iteratively repeating the reading, determining, and processing steps until all the events in the event log have been processed; and creating the statistical summary based on the statistical data.

24. The computer-readable medium of claim 23 wherein processing call information values further comprises creating and storing call initiation data for reporting on call initiation of each call when the current event is a Start of Call event.

25. The computer-readable medium of claim 23 wherein processing call information values further comprises determining whether any module data exists for a current module associated with a Start of Module event when the current event is the Start of Module event.

26. The computer-readable medium of claim 25 wherein determining whether any module data exists for a current module further comprises:

creating and storing a new module data element when no module data exists for the current module; and initializing the new module data element with current module information.

27. The computer-readable medium of claim 23 wherein processing call information values further comprises determining recognition context data when the current event is a Start of Recognition event.

28. The computer-readable medium of claim 27 wherein determining recognition context data further comprises:

determining a current recognition context value based on the event log;

initializing the recognition context data using the current recognition context value;

updating the current module data based on a previous recognition context value when the current recognition context has a status value that is not Spelling, Confirmation or Start of Recognition; and setting the status value of the current recognition context to Start of Recognition.

29. The computer-readable medium of claim 28 wherein updating the current module data based on a previous recognition context value further comprises incrementing a value representing a number of acceptances associated with attempts to collect primary module data from the caller when the previous recognition context is Accepted.

30. The computer-readable medium of claim 28 wherein updating the current module data based on a previous recognition context value further comprises incrementing a value representing a number of unknowns associated with attempts to collect primary module data from the caller when the previous recognition context is Confirmation.

31. The computer-readable medium of claim 28 wherein updating the current module data based on a previous recognition context value further comprises incrementing a value representing a number of rejections associated with attempts to collect primary module data from the caller when the previous recognition context is Rejected.

32. The computer-readable medium of claim 28 wherein updating the current module data based on a previous recognition context value further comprises incrementing a value representing a number of negative caller responses to confirmations associated with attempts to collect primary module data from the caller when the previous recognition context is Confirmed False.

33. The computer-readable medium of claim 28 wherein updating the current module data based on a previous recognition context value further comprises incrementing the number of collections of caller responses.

34. The computer-readable medium of claim 23 wherein processing call information values further comprises updating timing information associated with the current recognition context when a Beginning of Speech keyword is present and when the current event is a Start of Utterance event.

35. The computer-readable medium of claim 21 wherein generating the statistical summary further comprises generating a report describing transaction results for each module of the interactive speech application.

36. The computer-readable medium of claim 21 wherein generating the statistical summary further comprises generating a report of results of attempts to collect primary module data from the caller.

37. The computer-readable medium of claim 21 wherein generating the statistical summary further comprises generating a report describing recognition context results.

38. The computer-readable medium of claim 21 wherein generating the statistical summary further comprises generating a report describing context statistics.

39. The computer-readable medium of claim 36 wherein generating a report of results of attempts to collect primary module data further comprises, for each module of the interactive speech application, creating and displaying the percentage of attempts that were accepted, confirmed true, confirmed false, and rejected.

* * * * *